US012806968B1

(12) United States Patent
Glennon et al.

(10) Patent No.: US 12,806,968 B1
(45) Date of Patent: Nov. 24, 2026

(54) ELECTRIC DELIVERY VEHICLE WITH THERMAL MANAGEMENT SYSTEM

(71) Applicant: Oshkosh Defense, LLC, Oshkosh, WI (US)

(72) Inventors: Mark Glennon, Oshkosh, WI (US); Joseph DeHaan, Oshkosh, WI (US); David Steinberger, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 168 days.

(21) Appl. No.: 18/663,659

(22) Filed: May 14, 2024

Related U.S. Application Data

(60) Provisional application No. 63/502,324, filed on May 15, 2023.

(51) Int. Cl.
*B60H 1/32* (2006.01)
*B60H 1/00* (2006.01)

(52) U.S. Cl.
CPC ....... *B60H 1/3232* (2013.01); *B60H 1/00278* (2013.01); *B60H 1/00392* (2013.01); *B60H 2001/00307* (2013.01)

(58) Field of Classification Search
CPC ........ B60H 1/3232; B60H 2001/00307; B60H 1/00278
See application file for complete search history.

(56) References Cited

U.S. PATENT DOCUMENTS 8,336,319 B2 * 12/2012 Johnston ................ B60K 11/04 62/434
2022/0355645 A1 * 11/2022 Jeong ................ B60H 1/00664

* cited by examiner

*Primary Examiner* — Ana M Vazquez
(74) *Attorney, Agent, or Firm* — Foley & Lardner LLP

(57) ABSTRACT

A thermal management system includes a first loop in thermal communication with a component of a drivetrain of a vehicle, a second loop in thermal communication with a battery of the vehicle, a coolant tank in fluid communication with the first loop and the second loop, and a dual mode valve with a first configuration and a second configuration. The battery is configured to provide electrical energy to the drivetrain. The first loop operates in parallel with the second loop when the dual mode valve is in the first configuration. The first loop operates in series with the second loop when the dual mode valve is in the second configuration. The first loop is in fluid communication with the second loop when the dual mode valve is in either the first configuration or the second configuration.

14 Claims, 17 Drawing Sheets

ELECTRIC DELIVERY VEHICLE WITH THERMAL MANAGEMENT SYSTEM

CROSS-REFERENCE TO RELATED PATENT APPLICATION

This application claims the benefit of and priority to U.S. Provisional Patent Application No. 63/502,324, filed May 15, 2023, the entire disclosure of which is incorporated herein by reference in its entirety.

BACKGROUND

Delivery vehicles may have a number of doors, a cab, and a cargo portion. An operator may operate the vehicle from the cab. The cargo portion may serve as a storage area for parcels. The doors may provide entry and exit points for the operator to and from the cab and/or the cargo portion.

SUMMARY

One embodiment of the present disclosure is a thermal management system for a vehicle. The thermal management system includes a loop in thermal communication with a component of a drivetrain of a vehicle, a second loop in thermal communication with a battery of the vehicle, a coolant tank in fluid communication with the first loop and the second loop, and a dual mode valve transitionable between a first configuration and a second configuration. The first loop includes a first pump configured to circulate a coolant through the first loop. The battery is configured to provide electrical energy to the drivetrain. The second loop includes a second pump configured to circulate the coolant through the second loop. The first loop operates in parallel with the second loop when the dual mode valve is in the first configuration. The first loop operates in series with the second loop when the dual mode valve is in the second configuration. The first loop is in fluid communication with the second loop when the dual mode valve is in either the first configuration or the second configuration.

In some embodiments, the first loop is coupled to the second loop at a location proximate where the first loop is coupled to the coolant tank. In some embodiments, the second loop includes a heater configured to heat the coolant in the second loop. When the dual mode valve is in the second configuration, the coolant flowing serially through the first loop and the second loop flows through the heater.

In some embodiments, the vehicle includes an energy storage system ("ESS"). The ESS includes the battery, a front electrical distribution unit ("EDU") configured to distribute the electrical energy from the battery to a forward element of the drivetrain, and a rear electrical distribution unit configured to distribute the electrical energy from the battery to a rearward element of the drivetrain. A first portion of the first loop in thermal communication with the front EDU operates in parallel with a second portion of the first loop in thermal communication with the rear EDU.

In some embodiments, the thermal management system also includes a refrigerant system configured to adjust a temperature a cab of the vehicle, the refrigerant system in thermal communication with the second loop. In some embodiments, the first loop includes a radiator configured to radiate heat from the coolant flowing through the first loop. The refrigerant system includes a condenser configured to condense refrigerant flowing through the refrigerant system. The thermal management system includes a fan configured to force air across the radiator of the first loop and the condenser of the refrigerant system.

In some embodiments, the first loop includes a first return line in fluid communication with the coolant tank. The second loop includes a second return line in fluid communication with the coolant tank and coupled to the first return line such that the first return line and the second return line are in fluid communication. In some embodiments, the coolant tank includes an outlet coupled to the first return line and the second return line.

In some embodiments, the thermal management system includes processing circuitry.

The processing circuitry is configured to receive operational data associated with the thermal management system. The processing circuitry is also configured to determine, based on the operational data, an operational mode of the thermal management system. The operational mode is the first configuration of the dual mode valve or the second configuration of the dual mode valve. The processing circuitry is also configured to operate the thermal management system in the operational mode by placing the dual mode valve in the first configuration or the second configuration.

In some embodiments, the operational data corresponds to at least one of a charging state of the battery or a temperature of the coolant in the second loop being below a temperature threshold. In some embodiments, the coolant tank includes an outlet coupled to the first loop and the second loop such that the first loop and the second loop are in fluid communication with the coolant tank.

Another implementation of the present disclosure is a delivery vehicle. The delivery vehicle includes a chassis and a plurality of tractive elements, a battery including a plurality of batteries, a drivetrain configured to consume electrical energy provided by the plurality of batteries to drive the plurality of tractive elements, and a thermal management system. The thermal management system includes a first loop in thermal communication with a component of the drivetrain, a second loop in thermal communication with the battery assembly, and a coolant tank in fluid communication with the first loop and the second loop. The first loop includes a first pump configured to circulate a coolant through the first loop. The second loop includes a second pump configured to circulate the coolant through the second loop. In a first operational mode of the thermal management system, the first loop operates in parallel with the second loop. In a second operational mode of the thermal management system, the first loop operates in series with the second loop. The first loop is in fluid communication with the second loop when the thermal management system is in either the first operational mode or the second operational mode.

In some embodiments, the first loop is coupled to the second loop at a location proximate where the first loop is coupled to the coolant tank. In some embodiments, the second loop includes a heater configured to heat the coolant in the second loop. When the thermal management system is in the second operational mode, the coolant flowing serially through the first loop and the second loop flows through the heater.

In some embodiments, the delivery vehicle includes a front electrical distribution unit ("EDU") configured to distribute the electrical energy from the plurality of batteries to a forward element of the drivetrain and a rear electrical distribution unit configured to distribute the electrical energy from the plurality of batteries to a rearward element of the drivetrain. A first portion of the first loop in thermal communication with the front EDU operates in parallel with a second portion of the first loop in thermal communication with the rear EDU.

In some embodiments, the thermal management system includes a refrigerant system configured to adjust a temperature a cab of the delivery vehicle. The refrigerant system in thermal communication with the second loop. The refrigerant system includes a condenser configured to condense refrigerant flowing through the refrigerant system. The first loop includes a radiator configured to radiate heat from the coolant flowing through the first loop. The thermal management system includes a fan configured to force air across the radiator of the first loop and the condenser of the refrigerant system.

Another implementation of the present disclosure is a method of operating a thermal management system. The method includes receiving operational data associated with the thermal management system of a delivery vehicle. The thermal management system includes a first loop in thermal communication with a component of a drivetrain of the delivery vehicle, a second loop in thermal communication with a battery of the delivery vehicle configured to provide electrical energy to the drivetrain, and a coolant tank in fluid communication with the first loop and the second loop. The first loop includes a first plurality of conduits configured to circulate coolant through the first loop. The second loop includes a second plurality of conduits configured to circulate the coolant through the second loop. The method also includes determining, based on the operational data, an operational mode of the thermal management system. The operational mode is a first operational mode of the thermal management system where the first loop operates in parallel with the second loop or a second operational mode of the thermal management system where the first loop operates in series with the second loop. The method also includes operating the thermal management system in the operational mode. The first loop is in fluid communication with the second loop when the thermal management system is in either the first operational mode or the second operational mode.

In some embodiments, the operational data corresponds to at least one of a charging state of the battery or a temperature of the coolant in the second loop being below a temperature threshold. In some embodiments, the first loop includes a first return line in fluid communication with the coolant tank. The second loop includes a second return line in fluid communication with the coolant tank and coupled to the first return line such that the first return line and the second return line are in fluid communication. In some embodiments, responsive to receiving an update to the operational data, the method also includes changing the operational mode of the thermal management system from at least one of the first operational mode to the second operational mode or the second operational mode to the first operational mode.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
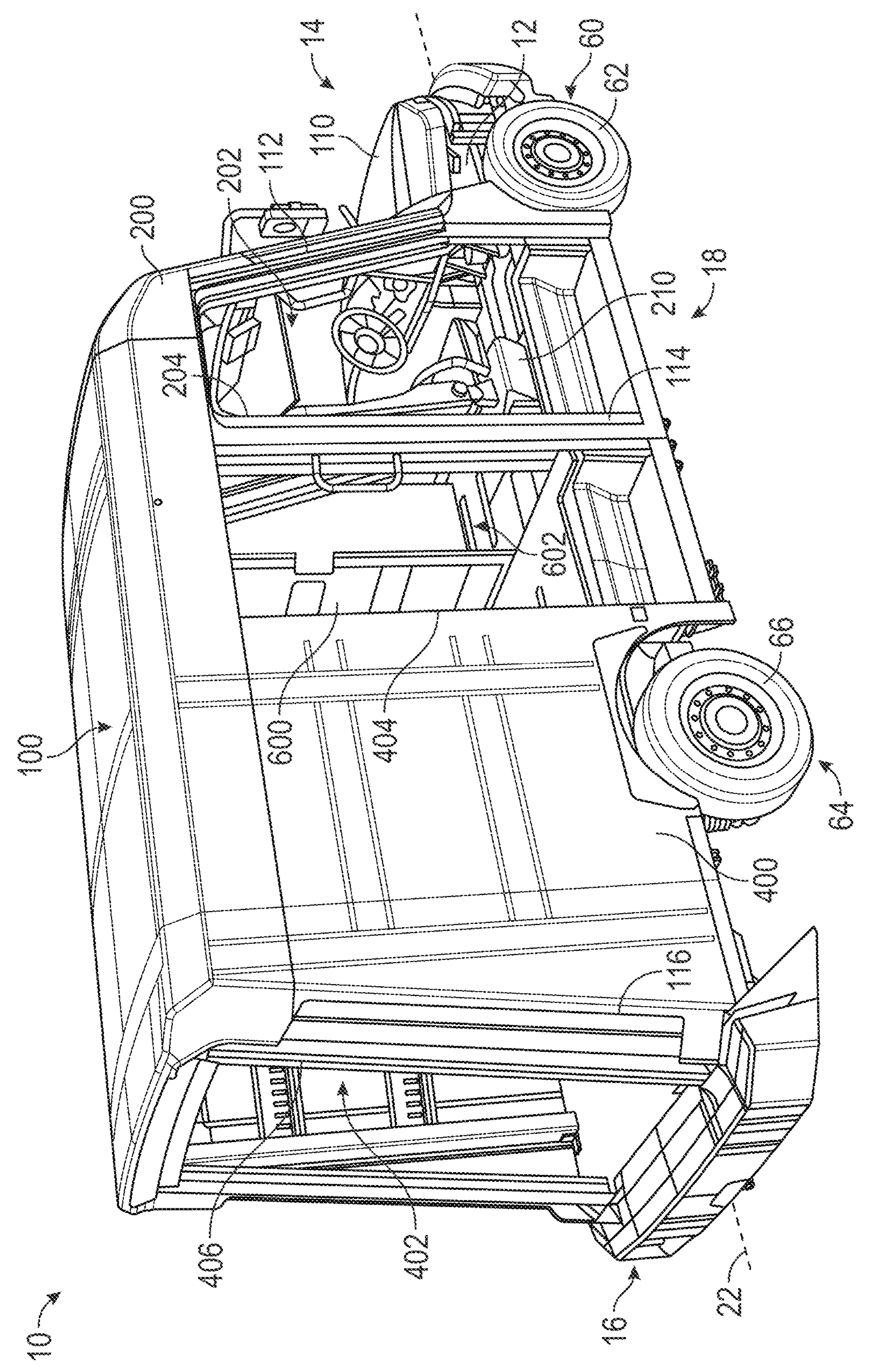
FIG. 1 is a rear perspective view of a delivery vehicle, according to an exemplary embodiment.
Figure 2:
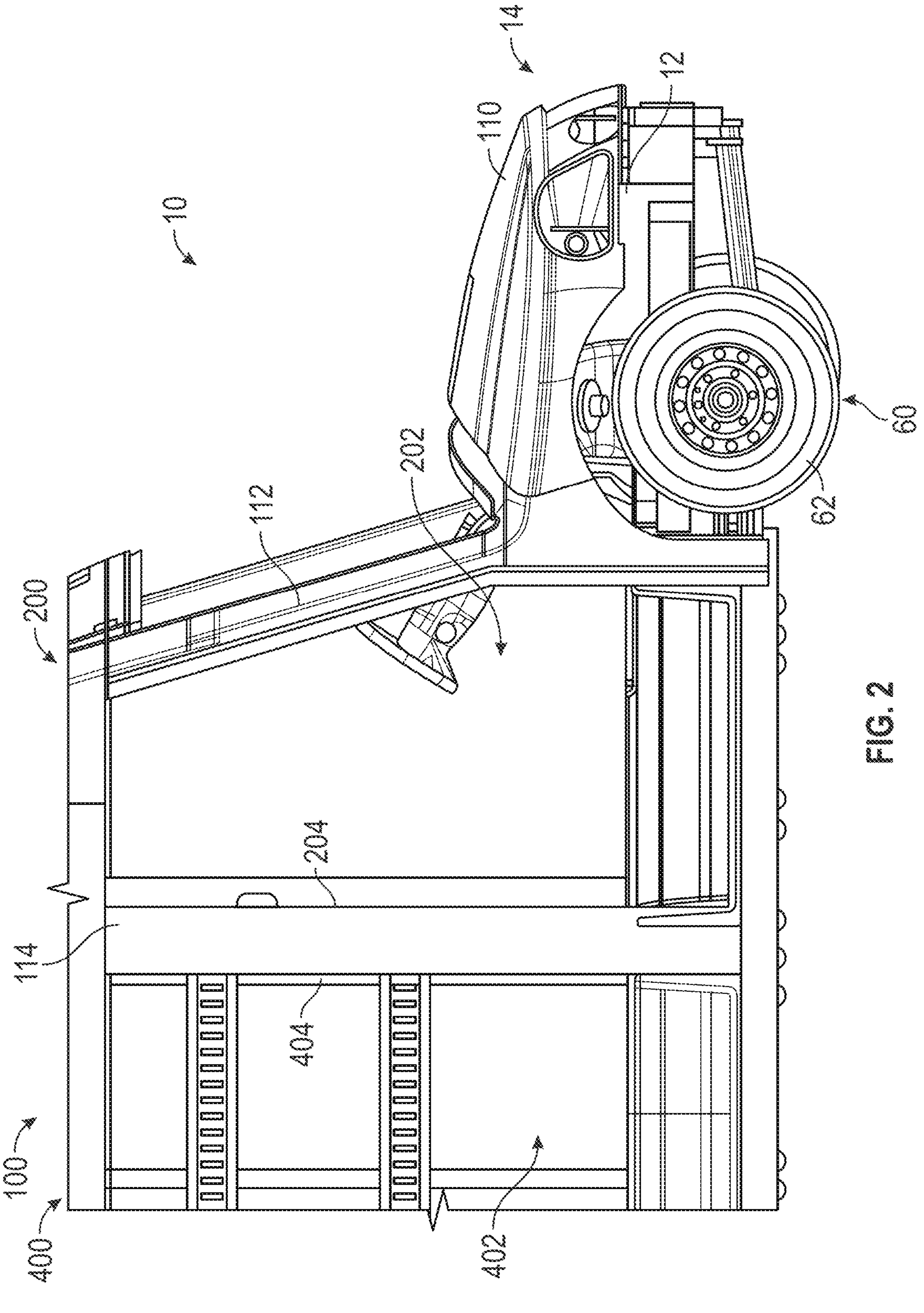
FIG. 2 is a partial side view of the delivery vehicle of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a thermal management system includes a first loop, a second loop, a coolant tank, and a switching valve (e.g., a dual mode valve, etc.). The first loop is in thermal communication with a component of a drive train and includes a first pump configured to circulate a coolant through the first loop. The second loop is in thermal communication with a battery and includes a second pump configured to circulate the coolant through the second loop. The coolant tank is in fluid communication with the first loop and the second loop and is configured to store the coolant. The switching valve is configured to be selectively positioned between a first configuration and a second configuration. When the switching valve is positioned in the first configuration, the first loop operates in parallel with the second loop. For example, a first portion of the coolant may flow through the first loop and a second portion of the coolant may flow through the second loop in parallel to the first portion of the coolant flowing through the first loop. When the switching valve is positioned in the second configuration, the first loop operates in series with the second loop. For example, the coolant may flow sequentially through the first loop and then the second loop. When the switching valve is positioned in either the first configuration or the second configuration, the first loop remains in fluid communication with the second loop proximate a location where the first loop is fluidly coupled to the coolant tank. For example, the first loop may be fluidly coupled to the coolant tank via a drivetrain return line, the second loop may be fluidly coupled to the coolant tank via a battery return line, and the drivetrain return line may be fluidly coupled to the battery return line such that coolant can flow between the first loop and the second loop when the switching valve is positioned in either the first configuration or the second configuration.

Such a thermal management system may advantageously allow for the switching valve to be positioned in the first configuration to allow for the first loop and the second loop to be independently thermally managed or the switching valve may be positioned in the second configuration to allow for thermal waste generated by components of the thermal management system associated with the first loop to be used to increase a temperature of the second loop so that the thermal waste generated by the components of the thermal management system associated with the first loop is recycled to increase the temperature of components of the thermal management system associated with the second loop. For example, when the switching valve is positioned in the second configuration, the coolant may be heated by the thermal waste generated by the drive train and then may heat the battery using the heat provided by the thermal waste. Additionally, the fluid communication between the first loop and the second loop in both the first configuration and the second configuration of the switching valve may advantageously allow for the pressure in the first loop and the second loop to be equalized proximate the coolant tank. Additionally, the fluid communication between the first loop and the second loop in both the first configuration and the second configuration of the switching valve may advantageously allow for the coolant to flow from the first loop to the second loop when a temperature decrease in the coolant in the second loop causes the coolant in the second loop to decrease in volume, which may prevent starvation in the second pump in the second loop or vice versa.

Overall Vehicle

According to the exemplary embodiment shown in FIGS. 1-7, a vehicle (e.g., a parcel vehicle, a cargo transport vehicle, a mail vehicle, a postal vehicle, a postal van, a truck, a van, etc.), shown as delivery vehicle 10, is configured to facilitate improved parcel delivery. Generally, the delivery vehicle 10 may be a specialized vehicle that transports parcels (e.g., mail, packages, etc.) from a distribution center (e.g., a post office, a warehouse, etc.) to various delivery locations (e.g., recipients' homes, offices, etc.).

As shown in FIGS. 1-7, the delivery vehicle 10 includes a chassis, shown as a frame 12. The frame 12 defines a first end, shown as front end 14, an opposing second end, shown as rear end 16, a first lateral side (e.g., a driver side, etc.), shown as right side 18, and an opposing second lateral side (e.g., a passenger side, etc.), shown as left side 20, of the delivery vehicle 10. While components of the delivery vehicle 10 may be described as being positioned along, proximate, adjacent, etc. the right side 18 or the left side 20 herein, it should be understood that such components could be positioned on the opposite side. As shown in FIG. 1, the frame 12 also defines a longitudinal axis, shown as central axis 22, extending longitudinally through the delivery vehicle 10 from the front end 14 to the rear end 16. As shown in FIG. 1-7, the frame 12 supports a first axle, shown as front axle 60, having a first plurality of tractive elements, shown as front wheels 62, coupled thereto; a second axle, shown as rear axle 64, having a second plurality of tractive elements, shown as rear wheels 66, coupled thereto; a power unit, shown as powertrain 70, that drives the front axle 60 and/or the rear axle 64 to move the delivery vehicle 10; and a body assembly, shown as body 100.

Figure 5:
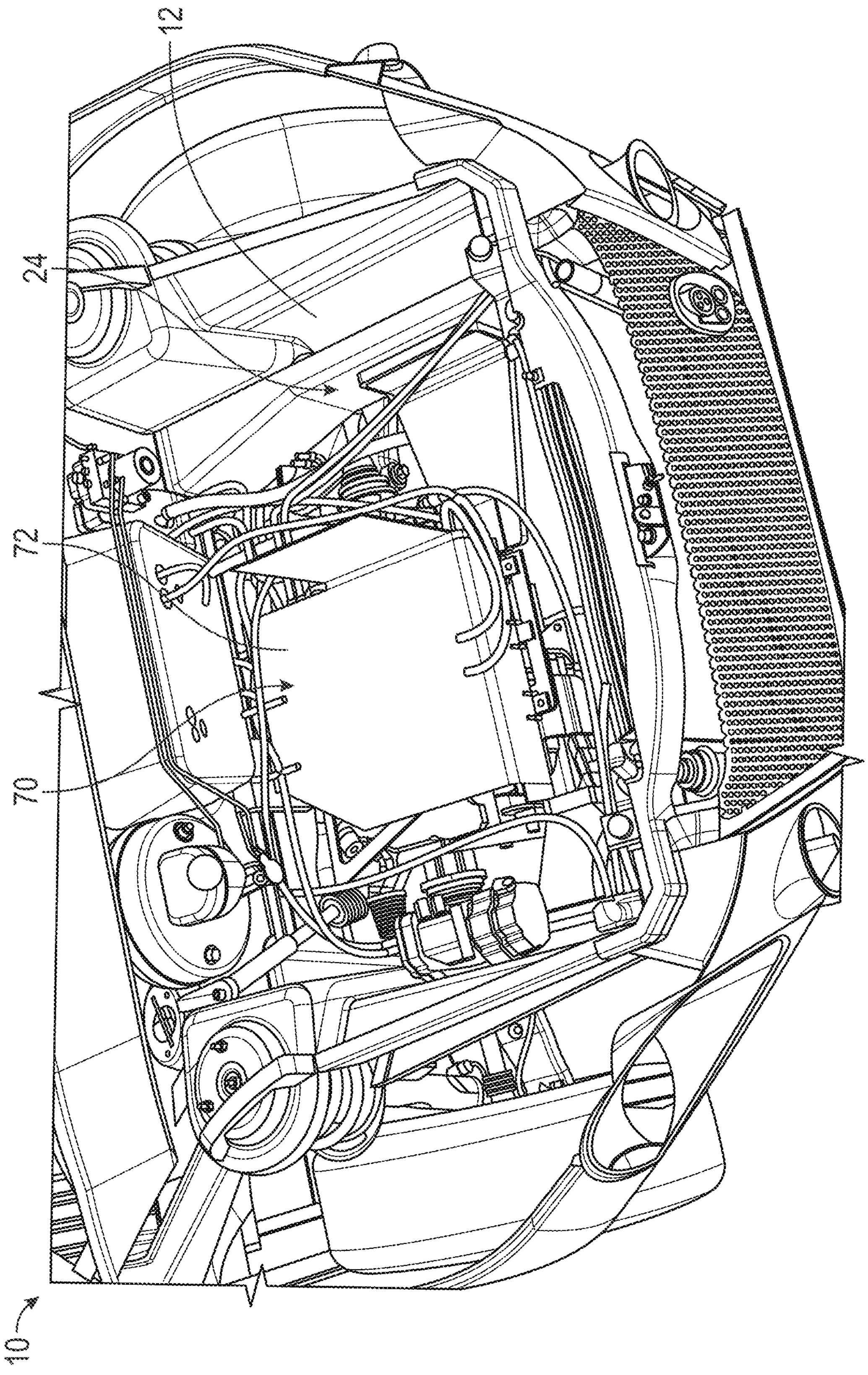
FIG. 5 is a detailed view of a primary driver compartment of the delivery vehicle of FIG. 1, according to an exemplary embodiment.
Figure 6:
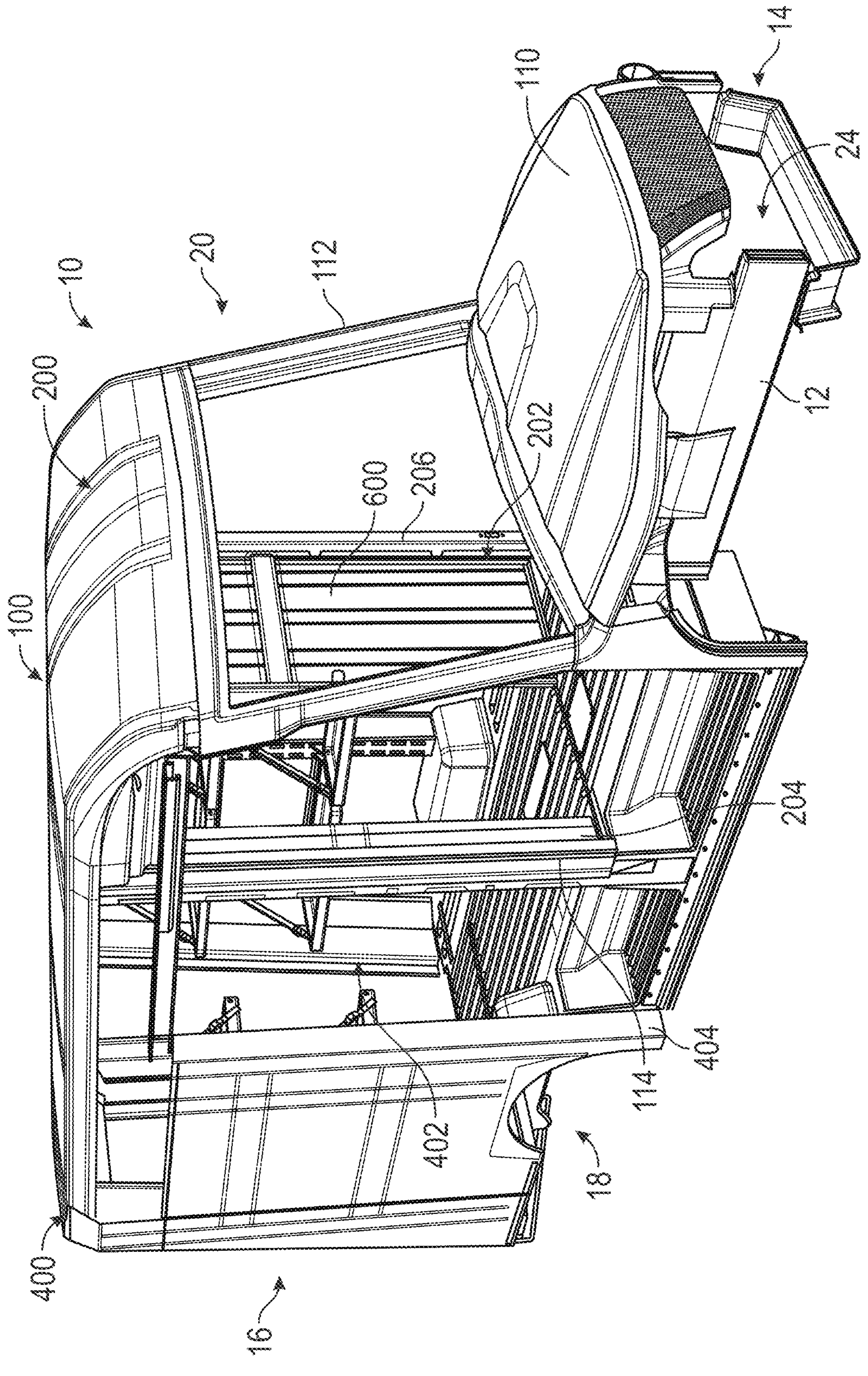
FIG. 6 is a right side perspective view of the delivery vehicle of FIG. 1 without a side door assembly, according to an exemplary embodiment.

As shown in FIG. 5, the powertrain 70 includes a primary driver or prime mover, shown as engine 72, coupled to and disposed within a primary driver compartment, shown as hood compartment 24, at the front end 14 of the frame 12. In some embodiments, the powertrain 70 is a traditional, internal combustion engine driven powertrain. In some embodiments, the powertrain 70 additionally includes on-board energy storage (e.g., a battery pack, etc.), a generator, and/or an electric motor to supplement the engine 72 such that the powertrain 70 is a hybrid powertrain. In some embodiments, the powertrain 70 does not include the engine 72. Rather, the primary driver may be an electric motor and the powertrain 70 may include on-board energy storage such that the powertrain 70 is an electric powertrain. In another embodiment, the primary diver includes a fuel cell and an electric motor such that the powertrain 70 is a fuel cell electric powertrain.

As shown in FIGS. 1-4, 6, and 7, the body 100 includes a hood, shown as hood 110, coupled to the front end 14 of the frame 12 and extending over the hood compartment 24 within which the engine 72 is positioned; a first pair of pillars, shown as A-pillars 112; a second pair of pillars, shown as B-pillars 114; a third pair of pillars, shown as C-pillars 116; a front cabin, shown as cab 200, positioned between the A-pillars 112 and the B-pillars 114; a rear storage section, shown as cargo body 400, positioned behind the cab 200 and between the B-pillars 114 and the C-pillars 116; a divider, shown as partition 600, extending between the B-pillars 114 and at least partially separating the cab 200 from the cargo body 400; and a door assembly, shown as side door assembly 700.

Figure 3:
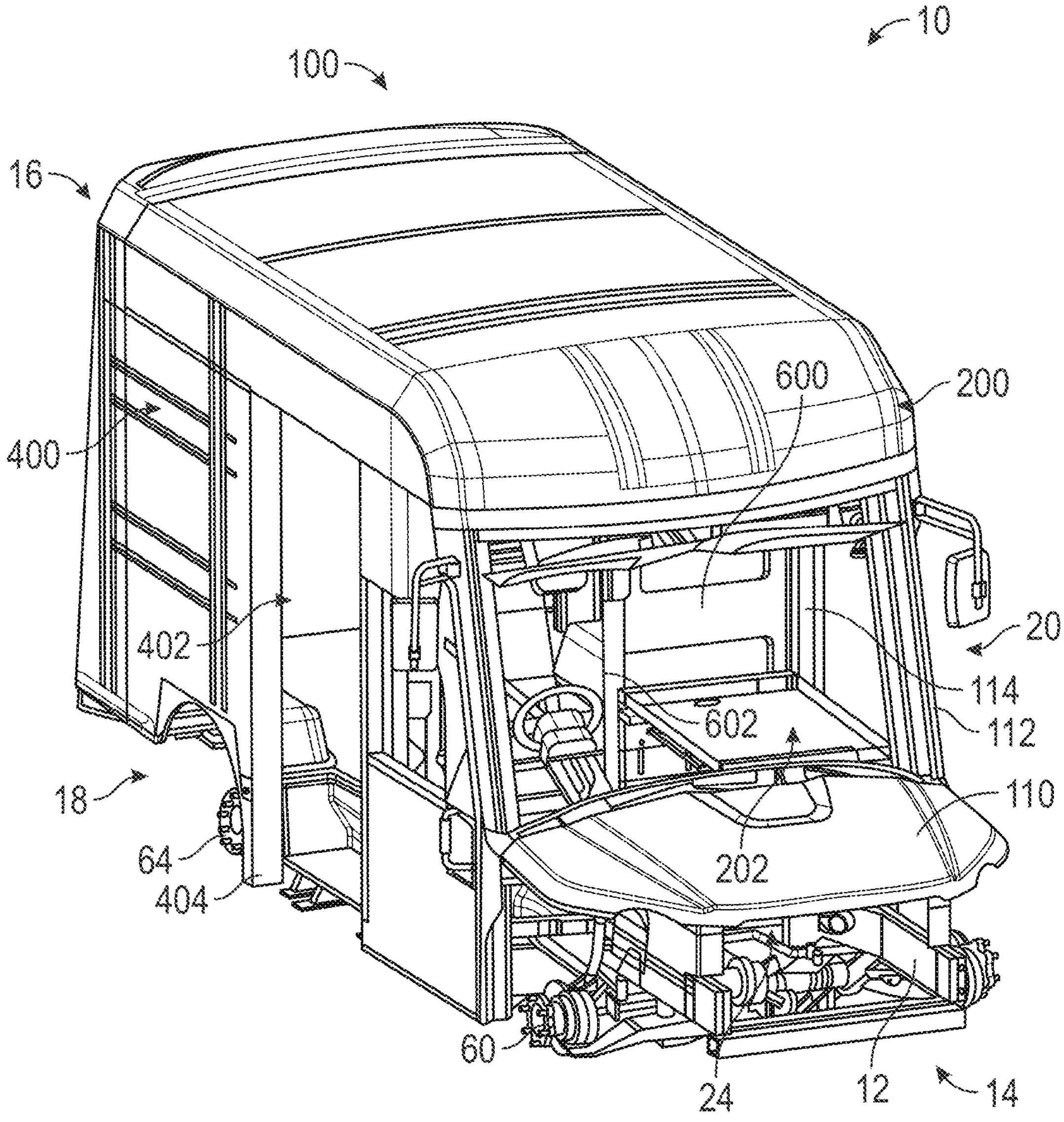
FIG. 3 is a front perspective view of the delivery vehicle of FIG. 1, according to an exemplary embodiment.
Figure 4:
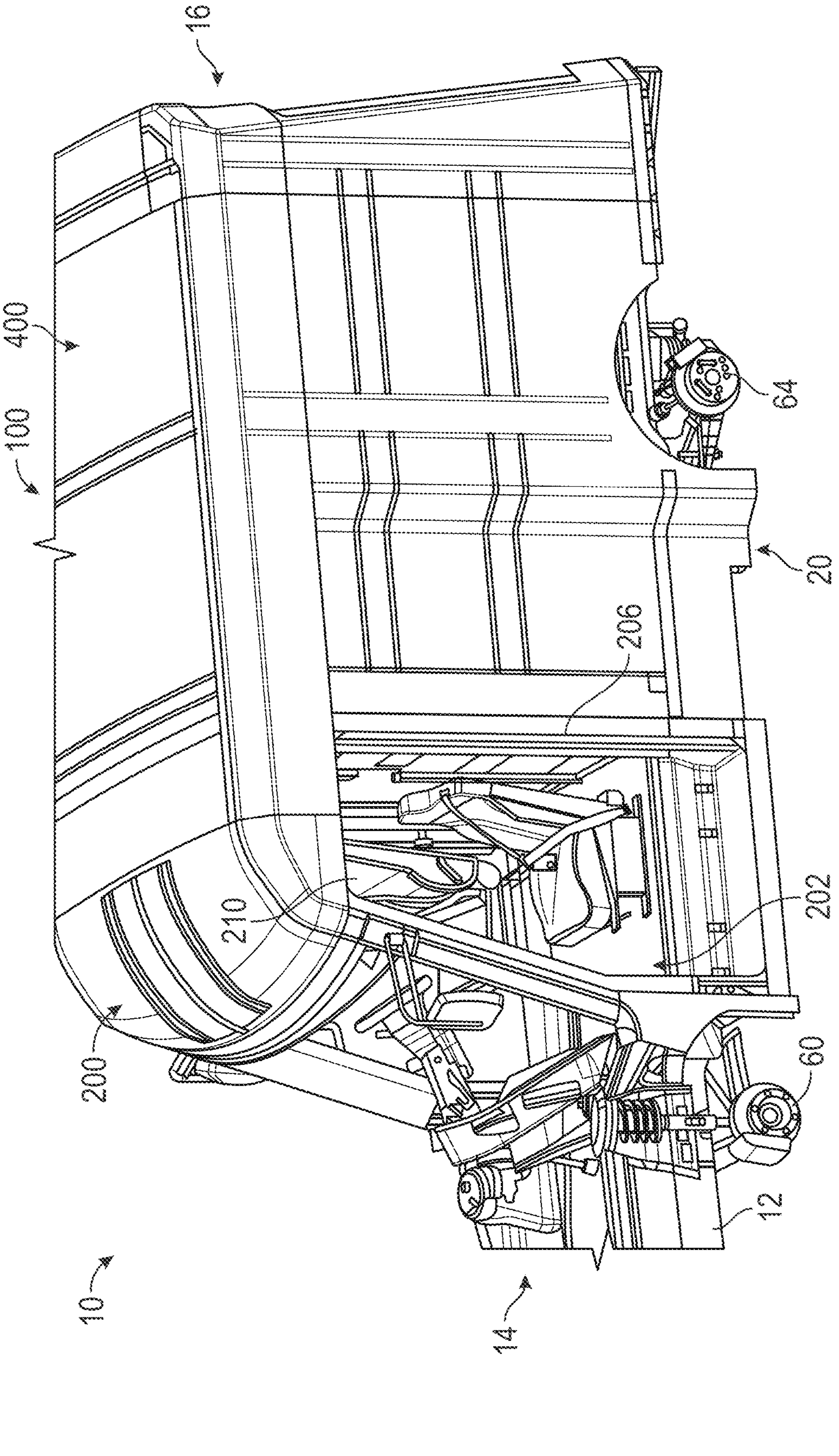
FIG. 4 is a left side perspective view of the delivery vehicle of FIG. 1, according to an exemplary embodiment.

As shown in FIGS. 1-4, 6, and 7, the cab 200 defines a first interior section or zone, shown as driver compartment 202, a first opening, shown as right cab opening 204, and a second opening, shown as left cab opening 206. The right cab opening 204 is positioned along the right side 18 of the delivery vehicle 10. The right cab opening 204 facilitates ingress into and egress from the driver compartment 202. The driver compartment 202 may be configured to contain or otherwise support a number of seats (e.g., one or more seats, etc.), storage units (e.g., a mail tray, etc.), and/or other equipment. As shown in FIGS. 1 and 4, the driver compartment 202 is configured to provide seating for an operator (e.g., a driver, etc.) of the delivery vehicle 10 with a seat, shown as driver seat 210. In some embodiments, the driver compartment 202 is configured to provide seating for a passenger of the delivery vehicle 10 (e.g., a temporary training seat, a repositionable passenger seat, etc.). The driver compartment 202 may also include various controls for driving the delivery vehicle 10 and/or operating the systems thereof (e.g., a user interface, a touchscreen, a display, a steering wheel, an accelerator pedal, a brake pedal, control levers, buttons, switches, etc.).

As shown in FIGS. 1-3 and 6, the cargo body 400 defines a second interior section or zone, shown as cargo compartment 402, a third opening, shown as side cargo opening 404, and a fourth opening, shown as rear cargo opening 406. The side cargo opening 404 is positioned along the right side 18 of the delivery vehicle 10 adjacent the right cab opening 204 with the right of the B-pillar 114 separating the two. The side cargo opening 404 facilitates ingress into and egress from the cargo compartment 402 from the right side 18 of the delivery vehicle 10. The rear cargo opening 406 is positioned at the rear end 16 of the delivery vehicle 10. The rear cargo opening 406 facilitates ingress into and egress from the cargo compartment 402 from the rear end 16 of the delivery vehicle 10. According to an exemplary embodiment, the cargo compartment 402 is configured to receive and store parcels (e.g., mail, packages, etc.) for transport and delivery via the delivery vehicle 10. In some embodiments, the cargo compartment 402 includes cabinets, shelves, racks, and/or other storage devices to facilitate organizing and securing the parcels within the cargo compartment 402.

As shown in FIGS. 1 and 3, the partition 600 is a partial partition that defines an opening, shown as passageway 602, that connects the driver compartment 202 to the cargo compartment 402. In some embodiments, the partition 600 includes a door or gate that at least partially and selectively encloses the passageway 602. In other embodiments, the partition 600 is a full partition that completely segregates the driver compartment 202 from the cargo compartment 402.

Figure 7:
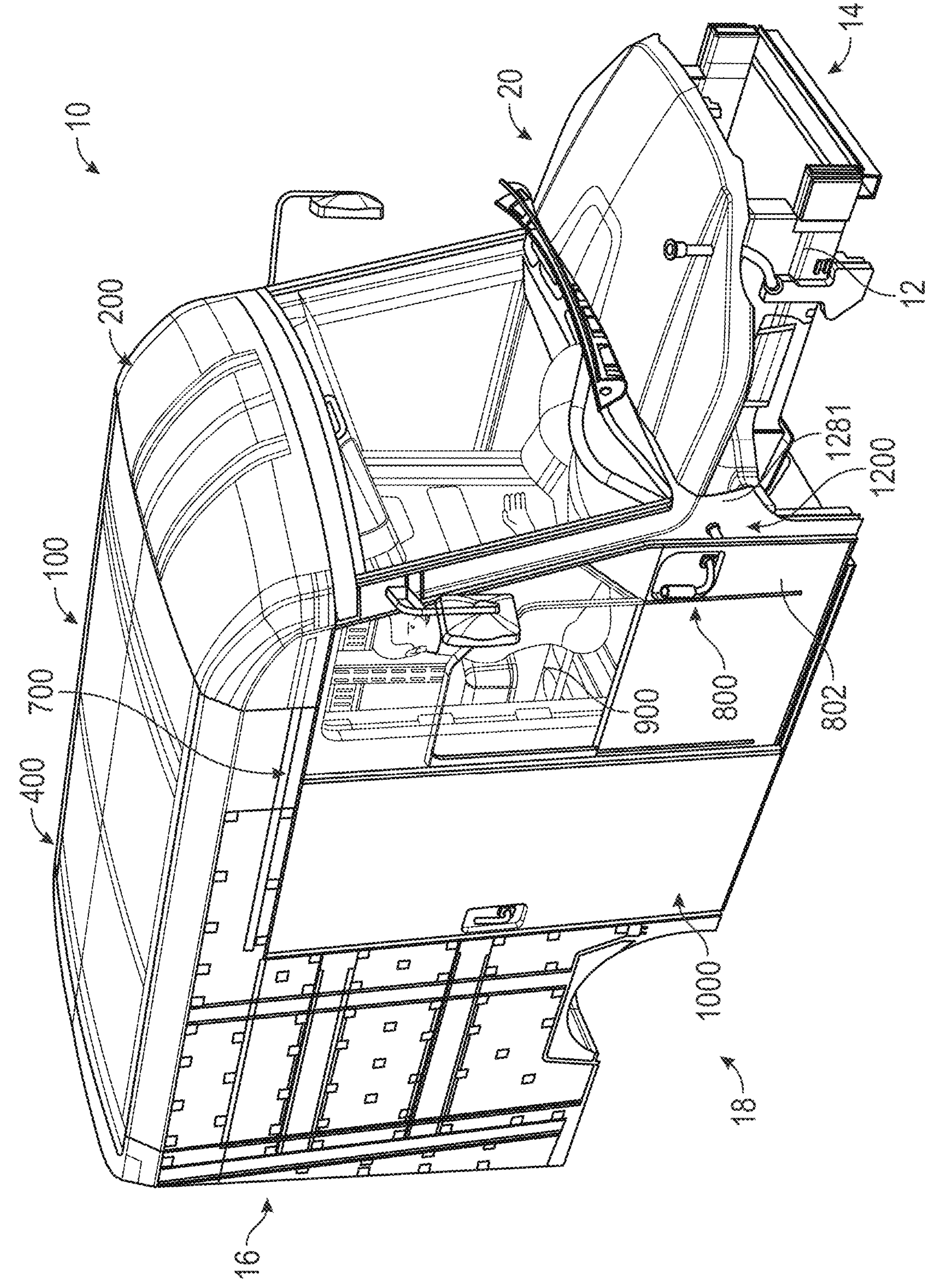
FIG. 7 is a right side perspective view of the delivery vehicle of FIG. 6 having the side door assembly, according to an exemplary embodiment.

As shown in FIG. 7, the side door assembly 700 includes a first door, shown driver cab door 800, a second door, shown as side cargo door 1000, and a locking assembly, shown as door locking assembly 1200. The driver cab door 800 extends over the right cab opening 204 and is selectively openable to access the driver compartment 202. According to an exemplary embodiment, the driver cab door 800 translates or slides rearward along the right side 18 of the body 100 from a closed position to an open position (e.g., such that the driver cab door 800 at least partially overlaps with the side cargo door 1000, extends past the B-pillar 114, etc.). In other embodiments, the driver cab door 800 is hingedly coupled to the body 100 (e.g., the A-pillar 112, etc.) and pivots between a closed position and an open position. As shown in FIG. 7, the driver cab door 800 includes a panel, shown as door panel 802, and a window assembly, shown as window assembly 900, disposed within the door panel 802. According to an exemplary embodiment, the delivery vehicle 10 includes a second cab door or passenger cab door positioned on the left side 20 of the cab 200 that extends over the left cab opening 206 and is selectively openable to access the driver compartment 202. The passenger cab door can similarly slide or pivot between an open position and a closed positioned to facilitate ingress into and egress from the cab 200 from the left side 20 of the delivery vehicle 10. According to an exemplary embodiment, the passenger cab door similarly includes a window disposed therein.

As shown in FIG. 7, the side cargo door 1000 extends over the side cargo opening 404 and is selectively openable to access the cargo compartment 402. According to an exemplary embodiment, the side cargo door 1000 translates or slides forward along the right side 18 of the body 100 from a closed position to an open position (e.g., such that the side cargo door 1000 at least partially overlaps with the driver cab door 800, toward the A-pillar 112, etc.). In another embodiment, the side cargo door 1000 translates or slides rearward along the right side 18 of the body 100 from a closed position to an open position (e.g., away from the right cab opening 204, toward the C-pillar 116, etc.). In other embodiments, the side cargo door 1000 is hingedly coupled to the body 100 (e.g., the B-pillar 114, etc.) and pivots between a closed position and an open position. According to an exemplary embodiment, the delivery vehicle 10 includes a rear door assembly that includes a rear cargo door. The rear cargo door extends over the rear cargo opening 406 and is selectively openable to access the cargo compartment 402.

Electric Delivery Vehicle

Overview

Figure 8:
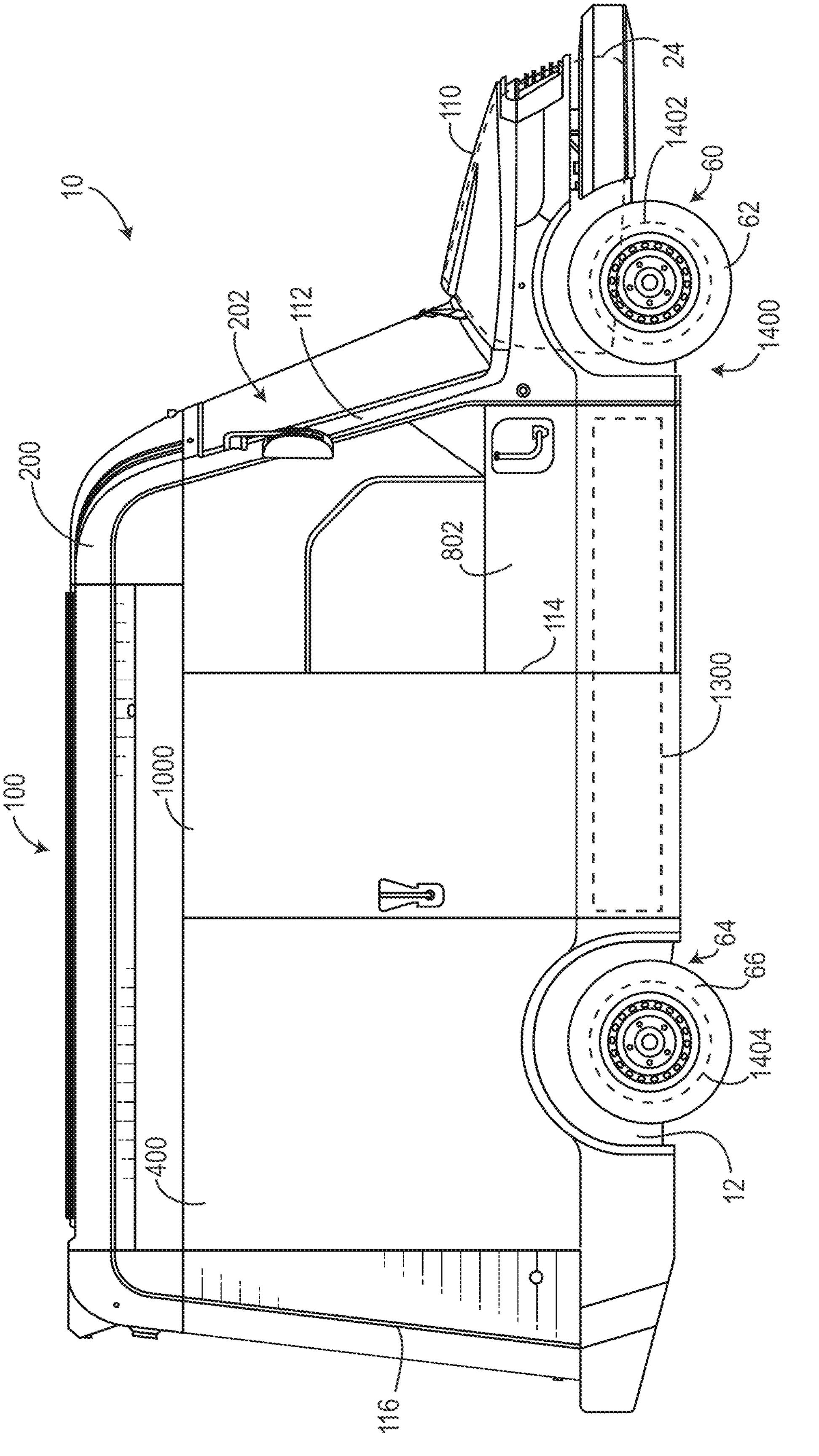
FIG. 8 is a side view of the delivery vehicle of FIG. 1 provided as an electric vehicle, according to an exemplary embodiment.

Referring to FIG. 8, the delivery vehicle 10 may be configured as a fully electric vehicle that uses electrical energy in order to transport (e.g., to drive the front wheels 62 and the rear wheels 66), according to an exemplary embodiment. The delivery vehicle 10 may include an electrical drivetrain 1400 (e.g., an electrically powered chassis, an electrically powered drive system, etc.) that includes a front electrified-axle ("E-axle") 1402 (e.g., a front electrical motor, an electrical transducer that consumes electrical energy and generates mechanical energy, a forward element of the electrical drivetrain 1400, etc.) and a rear E-axle 1404 (e.g., a rear electrical motor, a rearward element of the electrical drivetrain 1400, etc.). The electrical drivetrain 1400 also includes an electrical energy storage system ("ESS") 1300 that includes multiple battery cells, electrical storage devices, battery packs, batteries, etc. The ESS 1300 may be positioned beneath a floor of the delivery vehicle 10 and coupled with the frame 12 of the delivery vehicle 10. The ESS 1300 is configured to store electrical energy and provide electrical energy to the front E-axle 1402 and the rear E-axle 1404 (e.g., via high-voltage cables or power distribution system including an inverter) such that the front E-axle 1402 and the rear E-axle 1404 drive the front wheels 62 and the rear wheels 66, respectively, to transport the delivery vehicle 10. The front E-axle 1402 and the rear E-axle 1404 may be coupled with the frame 12 and provide support for the delivery vehicle 10. In some embodiments, the front E-axle 1402 is positioned at least partially within the hood compartment 24. Since the delivery vehicle 10 is powered using electric motors (e.g., the front E-axle 1402 and the rear E-axle 1404), the hood compartment 24 is not occupied by the engine 72, and provides space for one or more electrical components of the electrical drivetrain 1400 such as power distribution devices (e.g., inverters, wire routing, a thermal management system, a charging system, etc.).

Figure 9:
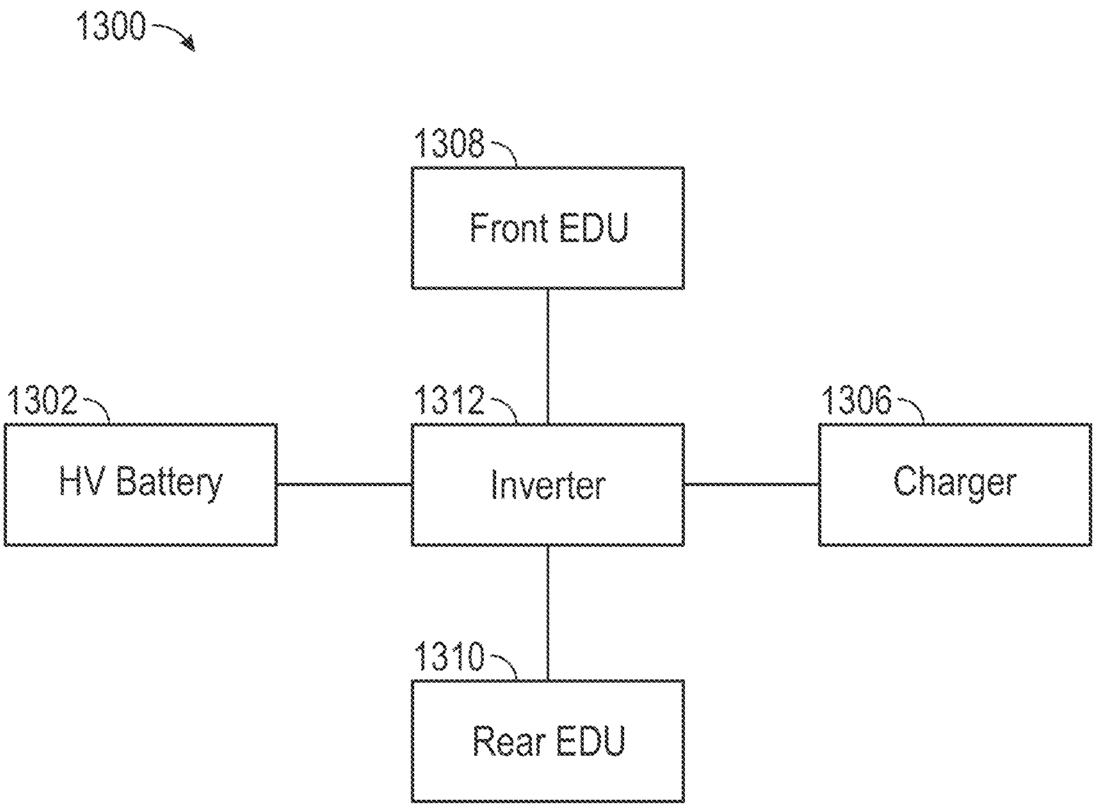
FIG. 9 is a schematic of an energy storage system of the delivery vehicle of FIG. 8, according to an exemplary embodiment.

As shown in FIG. 9, the ESS 1300 includes a battery (e.g., a battery pack, a plurality of batteries, a battery assembly, etc.), shown as battery 1302, configured to provide electrical energy to the front E-axle 1402, the rear E-axle 1404, and/or systems of the delivery vehicle 10, according to some embodiments. The battery 1302 is configured to store electrical energy and provide the electrical energy to the front e-axle 1402 and the rear e-axle 1404 to operate the delivery vehicle 10. For example, the battery 1302 may be electrically coupled to the front e-axle 1402 and the rear e-axle

1404 through wiring to provide the electrical energy to the front e-axle 1402 and the rear e-axle 1404. In various embodiments, the battery 1302 is electrically coupled to other electrical components of the delivery vehicle 10 (e.g., the window assembly 900, the electrical drivetrain 1400, etc.) and is configured to provide the electrical energy to the other electrical component of the delivery vehicle 10. For example, the battery 1302 may be electrically coupled to an electric motor configured to raise and lower a window of the window assembly 900 and the battery 1302 may provide the electrical energy to the electric motor to raise and lower the window of the window assembly 900. In some embodiments, the battery 1302 may include a plurality of batteries (e.g., a plurality of battery cells, etc.).

As shown in FIG. 9, the ESS 1300 includes a charger (e.g., a charging device, a charging assembly, etc.), shown as charger assembly 1306, configured to receive electrical energy from an external source (e.g., external to the delivery vehicle 10, etc.), according to some embodiments. For example, the charger assembly 1306 may be configured to receive electrical energy from an external charging station. In some embodiments, the charger assembly 1306 is configured to provide the electrical energy received from the external source to the battery 1302. For example, when charging the battery 1302, the charger assembly 1306 may receive electrical energy from the external source and provide the electrical energy to the battery 1302. The charger assembly 1306 may generate heat while providing the electrical energy to the battery 1302. In some embodiments, the charger assembly 1306 is configured to control a rate of the electrical energy being received from the external source. For example, the charger assembly 1306 may receive a control signal corresponding to reducing the rate of the electrical energy being provided to the battery 1302 and the charger assembly 1306 may throttle the rate of electrical energy received from the external source to reduce the rate of the electrical energy being provided to the battery 1302. In some embodiments, the ESS 1300 includes a plurality of the charger assemblies 1306. For example, the ESS 1300 may include a first of the charger assemblies 1306 proximate the front end 14 of the delivery vehicle 10 and a second of the charger assemblies 1306 at the rear end 16 of the delivery vehicle 10.

As shown in FIG. 9, the ESS 1300 includes a first electrical distribution unit ("EDU") (e.g., forward EDU, etc.), shown as front EDU 1308, electrically coupled between the battery 1302 and the front e-axle 1402. The front EDU 1308 may be configured to receive the electrical energy from the battery 1302 and provide the electrical energy to the front e-axle 1402. The front EDU 1308 may generate heat while providing the electrical energy to the front e-axle 1402. In some embodiments, the front EDU 1308 is configured to provide electrical energy to other systems of the delivery vehicle 10 positioned in a forward section of the delivery vehicle 10.

As shown in FIG. 9, the ESS 1300 includes a second electrical distribution unit ("EDU") (e.g., rearward EDU, etc.), shown as rear EDU 1310 electrically coupled between the battery 1302 and the rear e-axle 1404. The rear EDU 1310 may be configured to receive the electrical energy from the battery 1302 and provide the electrical energy to the rear e-axle 1404. The rear EDU 1310 may generate heat while providing the electrical energy to the rear e-axle 1404. In some embodiments, the rear EDU 1310 is configured to provide electrical energy to other systems of the delivery vehicle 10 positioned in a rearward section of the delivery vehicle 10.

As shown in FIG. 9, the ESS 1300 includes an inverter (e.g., a power distribution unit, a drive unit, a motor controller, etc.), shown as inverter 1312, electrically coupled between the (i) battery 1302 and (ii) the charger assembly 1306, the front EDU 1308, and the rear EDU 1310, according to some embodiments. In some embodiments, the inverter 1312 receives the electrical energy from the charger assembly 1306 and convert the electrical energy before providing the electrical energy to the battery 1302 (e.g., to charge the battery 1302, etc.). For example, the charger assembly 1306 may provide electrical energy with alternating current ("AC") to the inverter 1312 and the inverter 1312 may convert the electrical energy to have direct current ("DC") before providing the electrical energy to the battery 1302. In other embodiments, the charger assembly 1306 directly provides the electrical energy to the battery 1302 (e.g., when the battery 1302 is configured to receive the type of the electrical energy provided by the charger assembly 1306. The inverter 1312 may generate heat while converting the electrical energy received from the charger assembly 1306.

In some embodiments, the inverter 1312 receives the electrical energy from the battery 1302 and convers the electrical energy before providing the electrical energy to the front EDU 1308 and the rear EDU 1310. For example, the inverter 1312 may receive the electrical energy from the battery with DC and the inverter 1312 may convert the electrical energy to have AC before providing the electrical energy to the front EDU 1308 and the rear EDU 1310. In other embodiments, the battery 1302 directly provides the electrical energy to the front EDU 1308 and the rear EDU 1310 (e.g., when the front EDU 1308 and the rear EDU 1310 are configured to receive the type of electrical energy provided by the battery 1302, etc.). The inverter 1312 may generate heat while converting the electrical energy received from the battery 1302.

Thermal Management System

Figure 10:
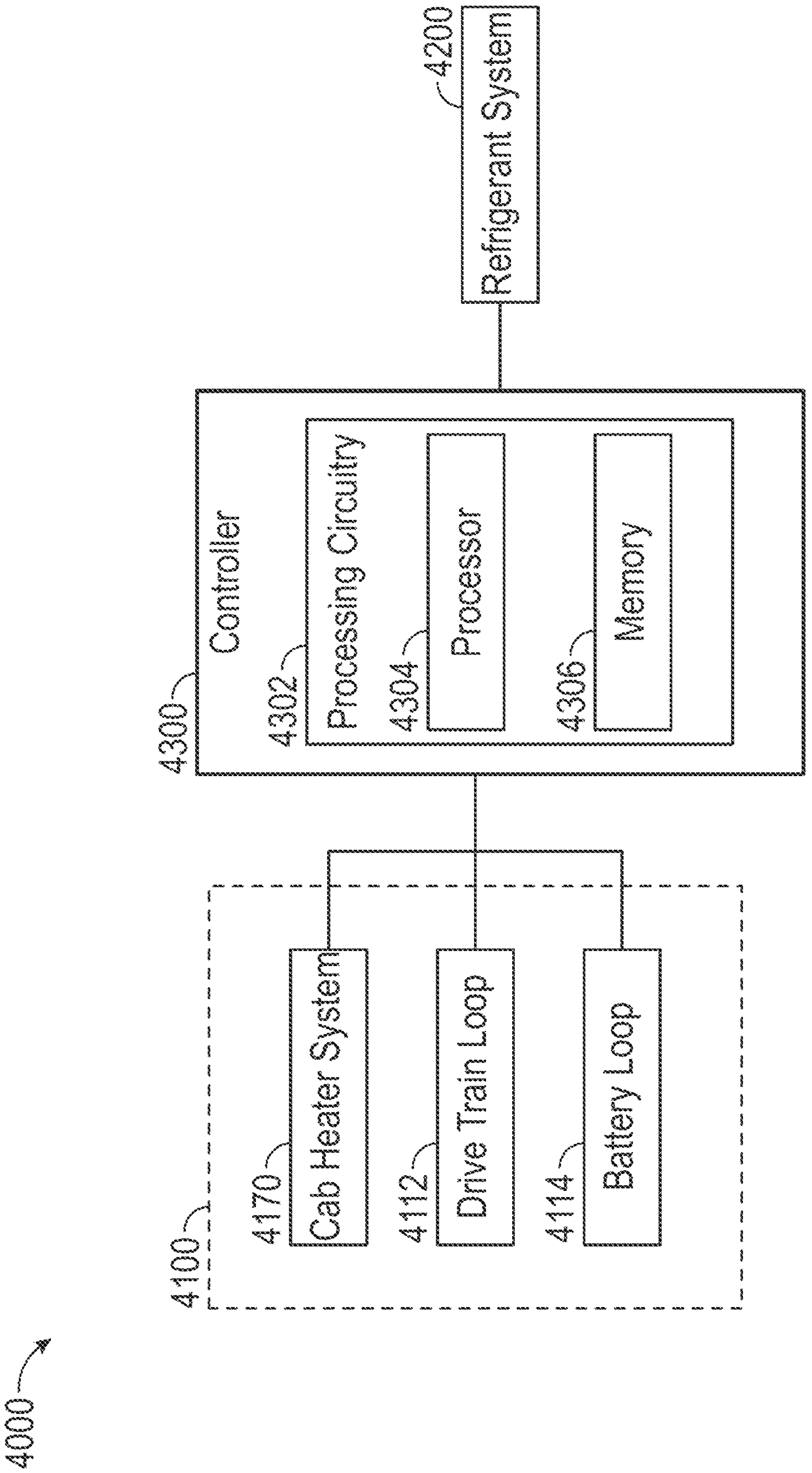
FIG. 10 is a schematic of a thermal management system of the delivery vehicle of FIG. 8, according to an exemplary embodiment.
Figure 11:
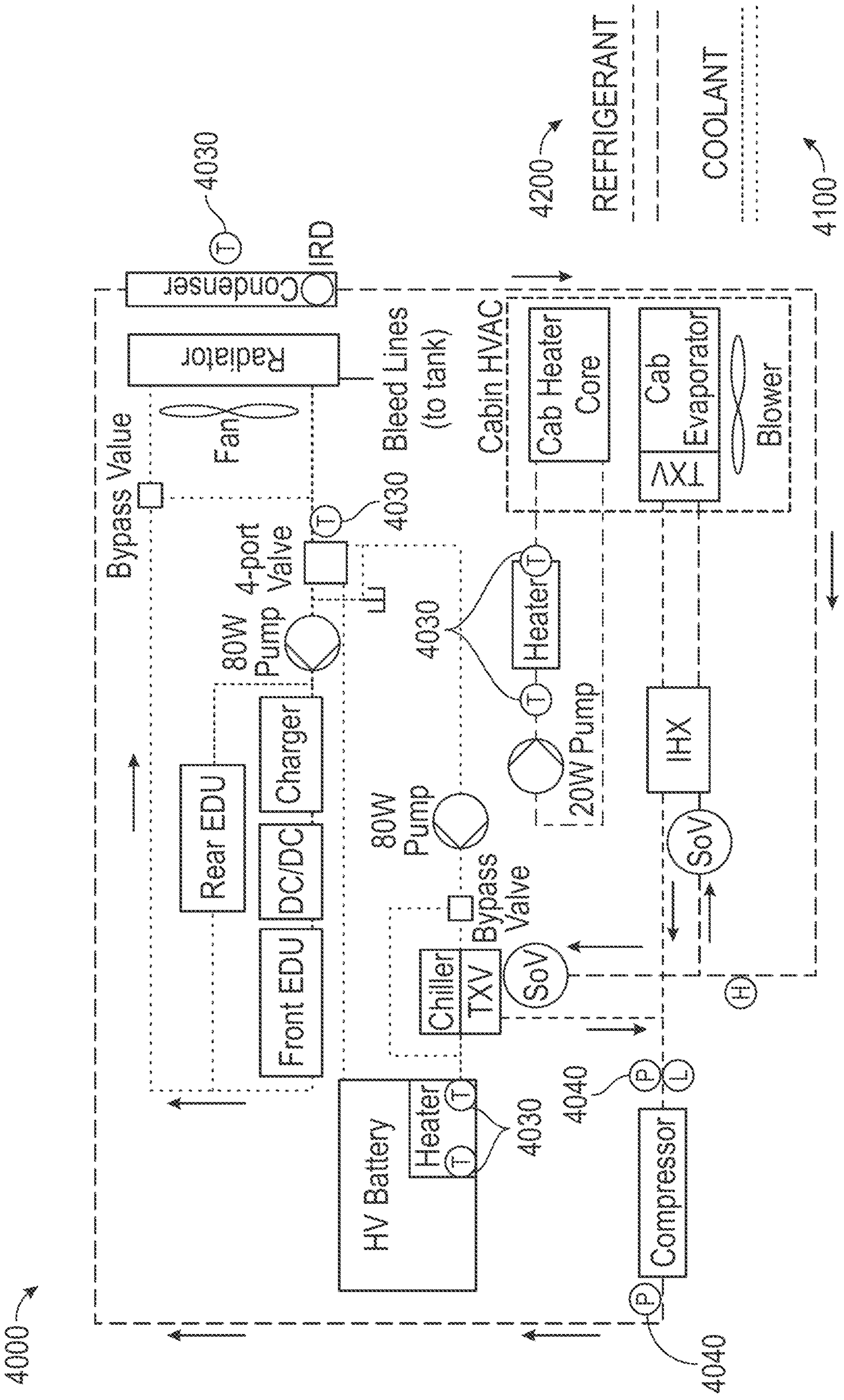
FIG. 11 is a schematic of a thermal management system of the delivery vehicle of FIG. 8, according to an exemplary embodiment.

As shown in FIGS. 10 and 11, the delivery vehicle 10 includes a thermal management system, shown as thermal management system 4000 configured to manage temperatures of the delivery vehicle 10, according to some embodiments. The thermal management system 4000 includes a coolant system (e.g., a cooling system, a radiator system, a preheating system, etc.), shown as coolant system 4100, configured to manage a temperature of elements of the delivery vehicle 10, according to some embodiments. The thermal management system 4000 also includes a refrigerant system (e.g., an air conditioning system, etc.), shown as refrigerant system 4200, configured to manage a temperature inside the cab 200 of the delivery vehicle 10, according to some embodiments. The thermal management system 4000 also includes a control system, shown as controller 4300, configured to operate the thermal management system 4000, according to some embodiments. In some embodiments, the coolant system 4100 is configured to increase the temperature inside the cab 200 of the delivery vehicle 10 and the refrigerant system 4200 is configured to decrease the temperature inside the cab 200 of the delivery vehicle 10 using a refrigerant. In other embodiments, the thermal management system 4000 does not include the refrigerant system 4200 (e.g., in configurations of the delivery vehicle 10 that do not include air conditioning in the cab 200, etc.).

As shown in FIG. 10, the coolant system 4100 includes a heater system (e.g., a cab heater loop, etc.), shown as cab heater system 4170, configured to provide heated air to the cab 200 of the delivery vehicle 10, according to some embodiments. The coolant system 4100 also includes a first loop (e.g., a first loop system, a drivetrain loop system, etc.), shown as drivetrain loop 4112, thermally coupled to the ESS 1300 and configured to manage temperatures of the ESS 1300, according to some embodiments. The coolant system 4100 also includes a second loop (e.g., a second loop system, a battery loop system, etc.), shown as battery loop 4114 thermally coupled to the ESS 1300 and configured to manage temperature of the battery 1302 according to some embodiments. In other embodiments, the coolant system 4100 does not include the cab heater system 4170 (e.g., in configurations of the delivery vehicle 10 that do not include heat in the cab 200, etc.).

Figure 12:
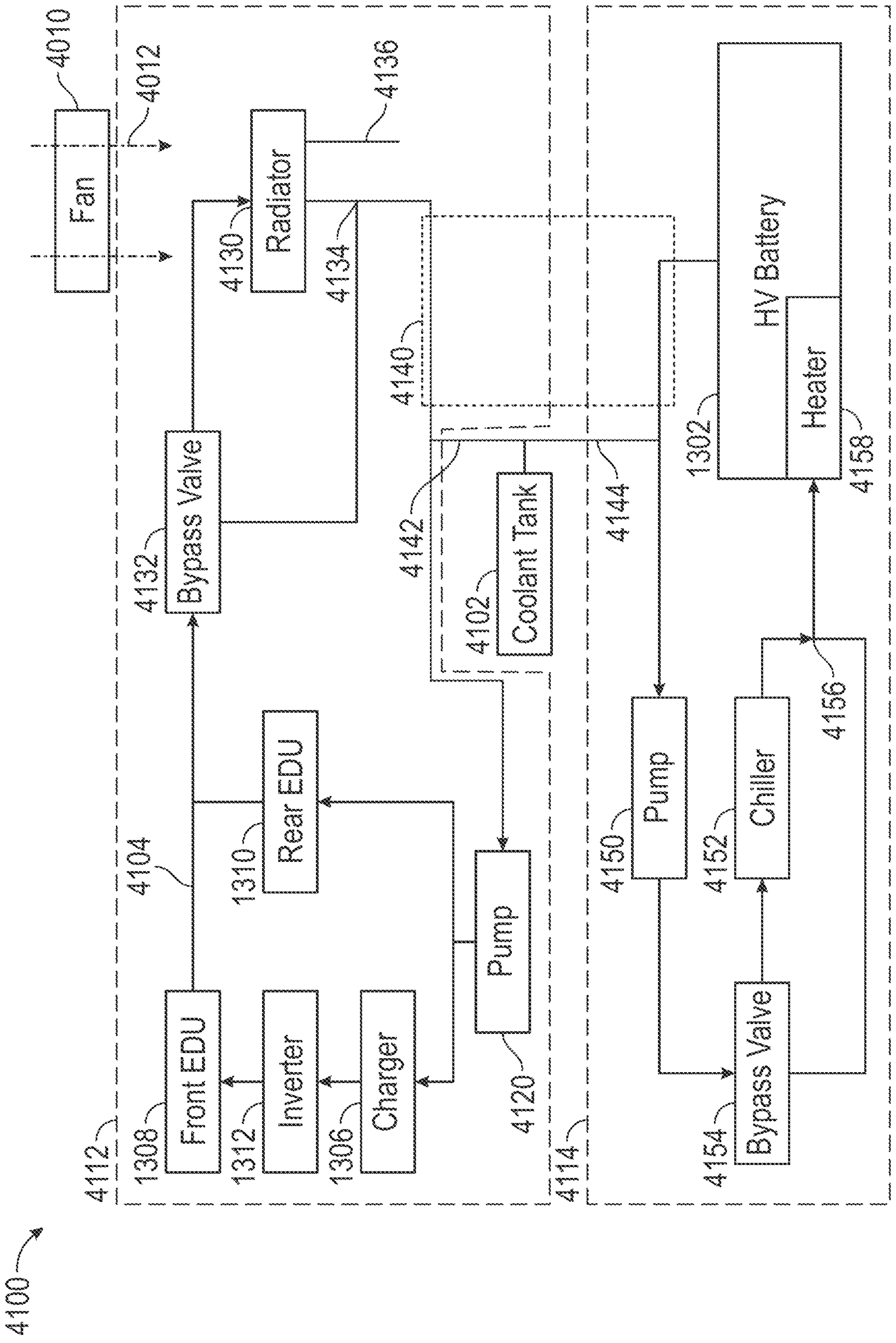
FIG. 12 is a schematic of a first configuration of a four-valve system of a coolant system of the thermal management system of FIG. 10, according to an exemplary embodiment.
Figure 13:
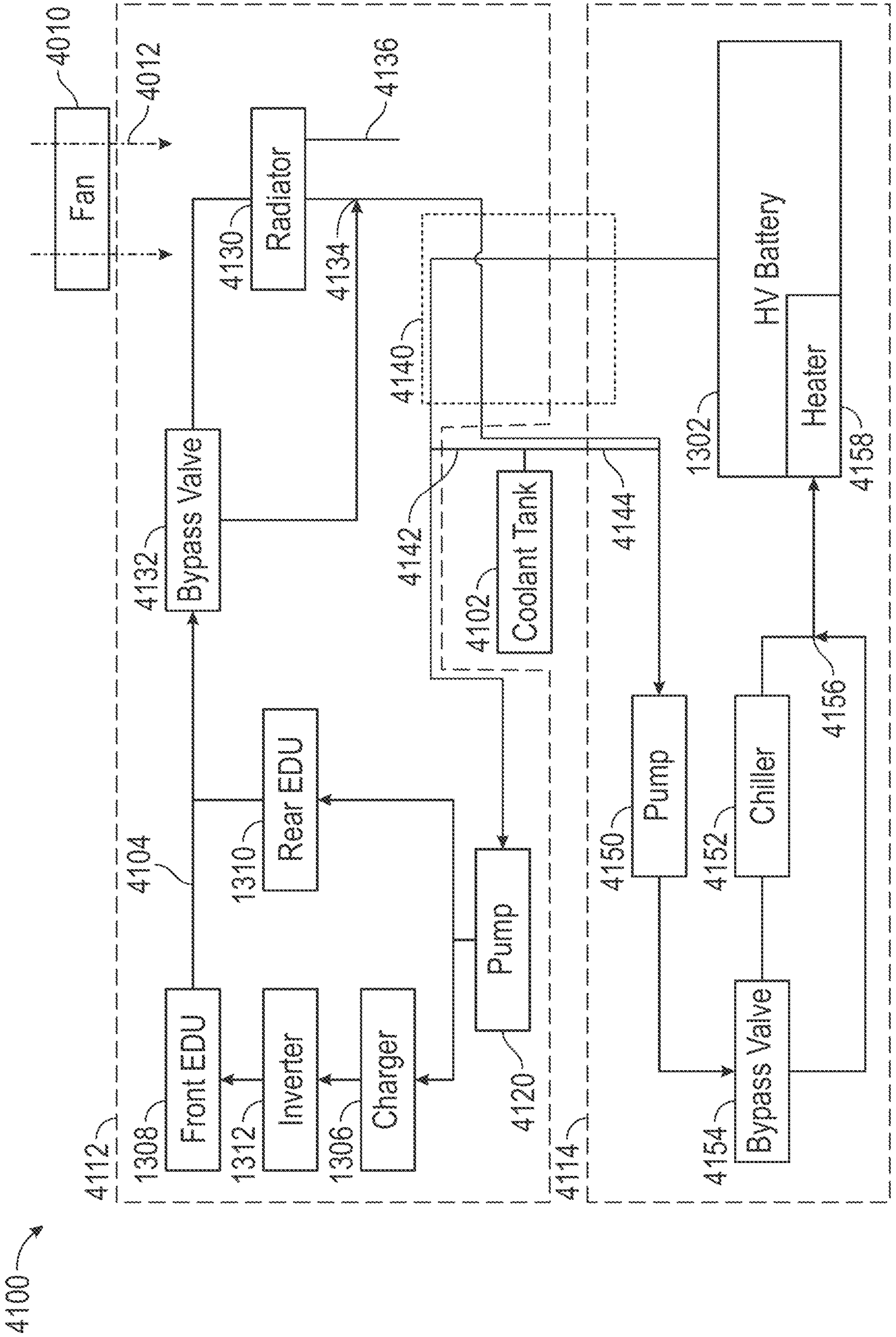
FIG. 13 is a schematic of a second configuration of the four-valve system of the coolant system of the thermal management system of FIG. 11, according to an exemplary embodiment.

As shown in FIGS. 10, 12, and 13, the coolant system 4100 includes a coolant (e.g., coolant fluid, antifreeze, radiator fluid, engine coolant, etc.), a tank (e.g., a storage tank, a fluid container, a reservoir, etc.), shown as coolant tank 4102, configured to store the coolant, and a series of conduits (e.g., lines, pipes, hoses, etc.), shown as coolant lines 4104, fluidly coupled to (e.g., in fluid communication with, coupled to allow fluid communication with, etc.) the coolant tank 4102 and configured to convey the coolant from the coolant tank 4102 and through the coolant system 4100, according to some embodiments. The coolant may be a fluid that has a sufficiently high thermal conductivity such that the coolant may absorb heat from the electrical drivetrain 1400 and/or the ESS 1300. The coolant lines 4104 may carry (e.g., facilitate the transfer or flow of) the coolant around the drivetrain loop 4112 and/or the battery loop 4114. For example, a first plurality of the coolant lines 4104 (e.g., a first plurality of conduits, etc.) may carry the coolant around the drivetrain loop 4112 and a second plurality of the coolant lines 4104 (e.g., a second plurality of conduits, etc.) may carry the coolant around the battery loop 4114.

In some embodiments, the coolant tank 4102 is configured as an expansion tank that intakes excess coolant from the coolant lines 4104 as the coolant expands in volume as the temperature of the coolant increases and provides coolant back into the coolant lines 4104 as the coolant contracts in volume as the temperature of the coolant decreases. In other embodiments, the coolant tank 4102 has a constant volume. The coolant tank 4102 may be configured to remove air bubbles from the coolant in the coolant system 4100. For example, the coolant tank 4102 may contain baffles (e.g., conduits, breaks, etc.) configured to remove air bubbles from the coolant. In some embodiments, the coolant tank 4102 may include an outlet coupled to the drivetrain loop 4112 and the battery loop 4114 such that the drivetrain loop 4112 and the battery loop 4114 are in fluid communication with the coolant tank 4102 and receive the coolant from and/or provide the coolant to the coolant tank 4102 through the outlet of the coolant tank 4102. In other embodiments, the coolant tank 4102 includes a first outlet coupled to the drivetrain loop 4112 and a second outlet coupled to the battery loop 4114.

As shown in FIGS. 12 and 13, the drivetrain loop 4112 includes a first pump, shown as drivetrain pump 4120 (e.g., a compressor), fluidly coupled to the coolant tank 4102, according to some embodiments. For example, the drivetrain pump 4120 may be fluidly coupled to the coolant tank 4102 via the coolant lines 4104 of the drivetrain loop 4112. The drivetrain pump 4120 is configured to circulate the coolant through the drivetrain loop 4112. For example, the drivetrain pump 4120 may be configured to receive (e.g., acquire, draw, retrieve, etc.) the coolant from the coolant tank 4102 and pressurize the coolant to force the coolant through the drivetrain loop 4112. The drivetrain pump 4120 may receive the coolant through an inlet of the drivetrain pump 4120 and provide the coolant through an outlet of the drivetrain pump 4120. The drivetrain pump 4120 may be a centrifugal pump, a reciprocating pump, a diaphragm pump, or any other type of pump or compressor that can circulate the coolant through the drivetrain loop 4112. In some embodiments, the drivetrain loop 4112 may include a plurality of the drivetrain pumps 4120 positioned around the drivetrain loop 4112 to circulate the coolant through the drivetrain loop 4112.

In some embodiments, the drivetrain pump 4120 is controlled by the controller 4300. For example, the drivetrain pump 4120 may include a motor (e.g., an electric motor, etc.) configured to operate the drivetrain pump 4120 to circulate the coolant through the drivetrain loop 4112. The motor of the drivetrain pump 4120 may receive control signals from the controller 4300 (e.g., wired control signals, wireless control signals, etc.) that cause the motor to operate the drivetrain pump 4120 to circulate the coolant through the drivetrain loop 4112 or to cause the motor to not operate the drivetrain pump 4120 so that the coolant is not circulated through the drivetrain loop 4112.

As shown in FIGS. 12 and 13, the drivetrain loop 4112 includes a radiator (e.g., a heat exchanger, a heat emitter, etc.), shown as radiator 4130, selectively fluidly coupled to the drivetrain pump 4120 and configured to receive heat from the coolant, according to some embodiments. For example, the radiator 4130 may be configured to receive heat contained in the coolant passing through the radiator 4130 and radiate the heat to air surrounding the radiator 4130 to decrease the temperature of the coolant. In some embodiments, the radiator 4130 may be orientated towards an opening in the hood 110 of the delivery vehicle 10 such that the movement of the delivery vehicle 10 forces air across the radiator 4130 that receives the heat radiated by the radiator 4130.

As shown in FIGS. 12 and 13, the drivetrain loop 4112 includes a first bypass valve (e.g., a diverter valve, etc.), shown as radiator bypass valve 4132, fluidly coupled to the drivetrain pump 4120, according to some embodiments. The radiator bypass valve 4132 is configured to selectively provide the coolant to the radiator 4130 such that the coolant flowing through the drivetrain loop 4112 passes through the radiator 4130 or bypass the coolant past the radiator 4130 such that the coolant circulating around the drivetrain loop 4112 does not pass through the radiator 4130 (e.g., via a first bypass loop, etc.). For example, the radiator bypass valve 4132 may be a two-way valve configured to direct the coolant received by the radiator bypass valve 4132 to an inlet of the radiator 4130 or around the radiator 4130.

As shown in FIG. 12, the radiator bypass valve 4132 may be placed in a first configuration that directs the coolant received by the radiator bypass valve 4132 through an inlet of the radiator 4130 to a first junction (e.g., a first intersection, etc.), shown as radiator bypass junction 4134. For example, when the radiator bypass valve 4132 is placed in the first configuration, the coolant outputted by the radiator bypass valve 4132 flows through the radiator 4130 to the radiator bypass junction 4134. As shown in FIG. 13, the radiator bypass valve 4132 may be placed in a second configuration that directs the coolant received by the radiator bypass valve 4132 to the radiator bypass junction 4134 without the coolant passing through the radiator 4130. For example, when the radiator bypass valve 4132 is placed in the second configuration, the coolant outputted by the radiator bypass valve 4132 flows to the radiator bypass junction 4134 without flowing through the radiator 4130.

In some embodiments, the radiator bypass valve 4132 may be controlled by the controller 4300. For example, the radiator bypass valve 4132 may include a motor (e.g., an electric motor, etc.) configured to alternate the radiator bypass valve 4132 between the first configuration that directs the coolant received by the radiator bypass valve 4132 to the inlet of the radiator 4130 and the second configuration that directs the coolant received by the radiator bypass valve 4132 to the radiator bypass junction 4134 without passing through the radiator 4130. The motor of the radiator bypass valve 4132 may receive control signals from the controller 4300 (e.g., wired control signals, wireless control signals, etc.) that cause the motor to operate the radiator bypass valve 4132 between the first configuration and the second configuration.

As shown in FIGS. 12 and 13, the drivetrain loop 4112 includes a release valve (e.g., a safety valve, a pressure release valve, etc.), shown as radiator release valve 4136, fluidly coupled to the radiator 4130, according to some embodiments. The radiator release valve 4136 may be configured to bleed the coolant from the radiator 4130 when a pressure of the coolant inside of the radiator 4130 exceeds a pressure threshold. The radiator release valve 4136 may prevent the pressure of the coolant inside of the radiator 4130 from exceeding the pressure threshold to prevent the radiator 4130 and/or the drivetrain loop 4112 from being damaged when the pressure of the coolant inside of the radiator 4130 exceeds the pressure threshold.

As shown in FIGS. 12 and 13, the coolant system 4100 includes a first coolant return line (e.g., a first return line, a first tank line, etc.), shown as drivetrain return line 4142, fluidly coupled between the coolant tank 4102 and the drivetrain loop 4112, according to some embodiments. The drivetrain return line 4142 may convey (e.g., facilitate the flow of coolant therebetween by providing a fluid flow path) the coolant between the drivetrain loop 4112 and the coolant tank 4102. For example, the drivetrain return line 4142 may convey the coolant from the coolant tank 4102 to the drivetrain loop 4112 when the coolant in the drivetrain loop 4112 decreases in volume as the temperature of the coolant in the drivetrain loop 4112 decreases and may convey the coolant from the drivetrain loop 4112 to the coolant tank 4102 when the coolant in the drivetrain loop 4112 increases in volume as the temperature of the coolant in the drivetrain loop 4112 increases. The drivetrain return line 4142 may be formed from the coolant lines 4104 and fluidly coupled between the coolant lines 4104 making up the drivetrain loop 4112 and the coolant tank 4102.

In some embodiments, the drivetrain return line 4142 is fluidly coupled to the drivetrain loop 4112 (e.g., fluidly coupled to the coolant lines 4104 forming the drivetrain loop 4112, etc.) between the radiator bypass junction 4134 and the drivetrain pump 4120. In other embodiments, the drivetrain return line 4142 is fluidly coupled to the drivetrain loop 4112 at a different location around the drivetrain loop 4112 (e.g., between the drivetrain pump 4120 and the radiator bypass junction 4134, between the radiator bypass valve 4132 and the radiator bypass junction 4134, between the radiator bypass valve 4132 and the radiator 4130, etc.).

As shown in FIGS. 12 and 13, the coolant system 4100 includes a first fan (e.g., blower, etc.), shown as radiator fan 4010, configured to force air, shown as forced air 4012, across the radiator 4130, according to some embodiments. By forcing the forced air 4012 across the radiator 4130, a rate of heat transfer between the radiator 4130 and the surroundings of the radiator 4130 may be increased, allowing for the radiator 4130 to receive additional heat from the coolant flowing through the radiator 4130 and decrease the temperature of the coolant flowing through the radiator 4130 by a greater amount. In some embodiments, the radiator fan 4010 produces a first portion of the forced air 4012 forced across the radiator 4130 and the movement of the delivery vehicle 10 produces a second portion of the forced air 4012 forced across the radiator 4130. In other embodiments, the coolant system 4100 does not include the radiator fan 4010 (e.g., when the movement of the delivery vehicle 10 produces the forced air 4012 forced across the radiator 4130, etc.).

In some embodiments, the radiator fan 4010 may be controlled by the controller 4300. For example, the radiator fan 4010 may include a motor (e.g., an electric motor, etc.) configured to operate the radiator fan 4010 to provide the forced air 4012 to the radiator 4130. The motor of the radiator fan 4010 may receive control signals from the controller 4300 that cause the motor to operate the radiator fan 4010 to provide the forced air 4012 to the radiator 4130 or not provide the forced air 4012 to the radiator 4130.

As shown in FIGS. 11 and 12, the drivetrain loop 4112 is thermally coupled (e.g., configured to receive heat from, configured to provide heat to, etc.) to the charger assembly 1306, the inverter 1312, the front EDU 1308, and the rear EDU 1310, according to some embodiments. For example, the coolant flowing through the drivetrain loop 4112 may receive heat generated by the charger assembly 1306, the inverter 1312, the front EDU 1308, and/or the rear EDU 1310. In some embodiments, the charger assembly 1306, the inverter 1312, the front EDU 1308, and the rear EDU 1310 are thermally coupled to the drivetrain loop 4112 between the drivetrain pump 4120 and the radiator bypass valve 4132. In other embodiments, the charger assembly 1306, the inverter 1312, the front EDU 1308, and the rear EDU 1310 are thermally coupled to the drivetrain loop 4112 at other locations around the drivetrain loop 4112.

In some embodiments, the charger assembly 1306, the inverter 1312, and the front EDU 1308 are thermally coupled to the drivetrain loop 4112 in parallel with the rear EDU 1310. For example, a first portion of the coolant flowing through the drivetrain loop 4112 may receive heat generated by the charger assembly 1306, the inverter 1312, and the front EDU 1308 and a second portion of the coolant flowing through the drivetrain loop 4112 may receive heat generated by the rear EDU 1310. By thermally coupling the charger assembly 1306, the inverter 1312, and the front EDU 1308 to the drivetrain loop 4112 in parallel with the rear EDU 1310 a distance traveled by the coolant through the drivetrain loop 4112 may be reduced. As a result, a size, a capacity, or a power consumption of the drivetrain pump 4120 may be reduced. In other embodiments, the drivetrain loop 4112 is thermally coupled in series to the inverter 1312 and the front EDU 1308, both of which are configured to be thermally coupled in parallel to the charger assembly 1306 and the rear EDU 1310. In still other embodiments, all the components of the drivetrain loop 4112 are positioned in series. In some embodiments, the drivetrain loop 4112 is thermally coupled to a component of the electrical drivetrain 1400. For example, the drivetrain loop 4112 may be thermally coupled to the front e-axle 1402 and/or the rear e-axle 1404.

As shown in FIGS. 12 and 13, the battery loop 4114 includes a second pump, shown as battery pump 4150, according to some embodiments. For example, the battery pump 4150 may be fluidly coupled to the coolant tank 4102 via the coolant lines 4104 of the battery loop 4114.

The battery pump 4150 is configured to circulate the coolant through the battery loop 4114. For example, the battery pump 4150 may be configured to receive the coolant from the coolant tank 4102 and pressurize the coolant to force the coolant through the battery loop 4114. The battery pump 4150 may receive the coolant through an inlet of the battery pump 4150 and provide the coolant through an outlet of the battery pump 4150. The battery pump 4150 may be a centrifugal pump, a reciprocating pump, a diaphragm pump, or any other type of pump that can circulate the coolant through the battery loop 4114. In some embodiments, the battery loop 4114 may include a plurality of the battery pumps 4150 positioned around the battery loop 4114 to circulate the coolant through the battery loop 4114.

In some embodiments, the battery pump 4150 may be controlled by the controller 4300. For example, the battery pump 4150 may include a motor (e.g., an electric motor, etc.) configured to operate the battery pump 4150 to circulate the coolant through the battery loop 4114. The motor of the battery pump 4150 may receive control signals from the controller 4300 (e.g., wired control signals, wireless control signals, etc.) that cause the motor to operate the battery pump 4150 to circulate the coolant through the battery loop 4114 or to cause the motor to not operate the battery pump 4150 so that the coolant is not circulated through the battery loop 4114.

As shown in FIGS. 12 and 13, the battery loop 4114 includes a chiller (e.g., a heat exchanger, etc.), shown as chiller 4152, configure to facilitate transferring heat from the coolant in the drivetrain loop 4112 to the refrigerant system 4200, according to some embodiments. For example, the chiller 4152 may be configured to receive heat contained in the coolant passing through the chiller 4152 and transfer the heat to the refrigerant system 4200 to decrease the temperature of the coolant.

As shown in FIGS. 12 and 13, the battery loop 4114 includes a second bypass valve, shown as chiller bypass valve 4154, fluidly coupled to the battery pump 4150, according to some embodiments. The chiller bypass valve 4154 is configured to selectively provide the coolant to the chiller 4152 such that the coolant flowing through the battery loop 4114 passes through the chiller 4152 or bypass the coolant past the chiller 4152 such that the coolant circulating around the battery loop 4114 does not pass through the chiller 4152 (e.g., via a second bypass loop, etc.). For example, the chiller bypass valve 4154 may be a two-way valve configured to direct the coolant received by the chiller bypass valve 4154 to an inlet of the chiller 4152 or around the chiller 4152.

As shown in FIG. 12, the chiller bypass valve 4154 may be placed in a first configuration that directs the coolant received by the chiller bypass valve 4154 through an inlet of the chiller 4152 to a second junction (e.g., a second intersection, etc.), shown as chiller bypass junction 4156. For example, when the chiller bypass valve 4154 is placed in the first configuration, the coolant outputted by the chiller bypass valve 4154 flows through the chiller 4152 to the chiller bypass junction 4156. As shown in FIG. 13, the chiller bypass valve 4154 may be placed in a second configuration that directs the coolant received by the chiller bypass valve 4154 to the chiller bypass junction 4156 without the coolant passing through the chiller 4152. For example, when the chiller bypass valve 4154 is placed in the second configuration, the coolant outputted by the chiller bypass valve 4154 flows to the chiller bypass junction 4156 without flowing through the chiller 4152.

In some embodiments, the chiller bypass valve 4154 may be controlled by the controller 4300. For example, the chiller bypass valve 4154 may include a motor (e.g., an electric motor, etc.) configured to alternate the chiller bypass valve 4154 between the first configuration that directs the coolant received by the chiller bypass valve 4154 to the inlet of the chiller 4152 and the second configuration that directs the coolant received by the chiller bypass valve 4154 to the chiller bypass junction 4156 without passing through the chiller 4152. The motor of the chiller bypass valve 4154 may receive control signals from the controller 4300 (e.g., wired control signals, wireless control signals, etc.) that cause the motor to operate the chiller bypass valve 4154 between the first configuration and the second configuration.

As shown in FIGS. 12 and 13, the battery loop 4114 includes a first heater (e.g., a coolant heater, a heating element, etc.), shown as battery heater 4158, configured to heat (e.g., increase a temperature of, etc.) the coolant passing through the battery heater 4158, according to some embodiments. For example, the battery heater 4158 may be operated to heat the coolant such that the coolant can transfer heat to elements of the delivery vehicle 10 to operate the delivery vehicle 10 more efficiently. As shown in FIGS. 12 and 13 the battery heater 4158 is fluidly coupled to the chiller bypass junction 4156. In some embodiments, the battery heater 4158 is coupled to the battery 1302. In some embodiments, the battery heater 4158 may be controlled by the controller 4300. For example, the battery heater 4158 may be configured as an electric heater configured to apply an electric current through elements of the battery heater 4158 to provide heat to the coolant. The battery heater 4158 may receive control signals from the controller 4300 that cause the battery heater 4158 to apply the electric current through the elements of the battery heater 4158 to provide the heat to the coolant.

As shown in FIGS. 11 and 12, the battery loop 4114 is thermally coupled to the battery 1302, according to some embodiments. For example, the coolant flowing through the battery loop 4114 may provide heat contained in the coolant to the battery 1302 and/or the coolant flowing through the battery loop 4114 may receive heat generated by the battery 1302. In some embodiments, the battery 1302 is thermally coupled to the battery loop 4114 between the battery heater 4158 and the battery pump 4150. In other embodiments, the battery heater 4158 is thermally coupled to the battery loop 4114 at other locations around the battery loop 4114.

In some embodiments, the battery loop 4114 may be operated to provide heat to the coolant and the coolant may flow past the battery 1302 to provide the heat to the battery 1302 before using the battery 1302 to provide the electrical energy to the electrical drivetrain 1400. For example, the battery 1302 may perform optimally when the battery 1302 is within a specific temperature range and the battery loop 4114 may heat the battery 1302 such that a temperature of the battery 1302 is within the specific temperature range to promote the optimal operation of the battery 1302. In some embodiments, the battery heater 4158 may be operated to provide heat coolant flowing past the battery 1302 to provide the heat to the battery 1302 before charging the battery 1302. For example, the battery 1302 may charge faster when the battery 1302 is within a specific temperature range and the battery heater 4158 may provide the heat to the coolant to provide to the battery 1302 such that a temperature of the battery 1302 is within the specific temperature range to promote fast charging of the battery 1302.

In various embodiments, the chiller 4152 and the battery heater 4158 are configured to decrease the temperature of the coolant or increase the temperature of the coolant such that the temperature of the battery 1302 is maintained within a range of preferred operating temperatures of the battery 1302.

As shown in FIGS. 12 and 13, the coolant system 4100 includes a second coolant return line (e.g., a second return line, a second tank line, etc.), shown as battery return line 4144, fluidly coupled between the coolant tank 4102 and the battery loop 4114, according to some embodiments. The battery return line 4144 may convey the coolant between the battery loop 4114 and the coolant tank 4102. For example, the battery return line 4144 may convey the coolant from the coolant tank 4102 to the battery loop 4114 when the coolant in the battery loop 4114 decreases in volume as the temperature of the coolant in the battery loop 4114 decreases and may convey the coolant from the battery loop 4114 to the coolant tank 4102 when the coolant in the battery loop 4114 increases in volume as the temperature of the coolant in the battery loop 4114 increases. The battery return line 4144 may be formed from the coolant lines 4104 and fluidly coupled between the coolant lines 4104 making up the battery loop 4114 and the coolant tank 4102.

In some embodiments, the battery return line 4144 is fluidly coupled to the battery loop 4114 (e.g., fluidly coupled to the coolant lines 4104 forming the battery loop 4114, etc.) between the chiller bypass junction 4156 and the battery pump 4150. In other embodiments, the battery return line 4144 is fluidly coupled to the battery loop 4114 at a different location around the battery loop 4114 (e.g., between the drivetrain pump 4120 and the chiller bypass valve 4154, between the chiller bypass valve 4154 and the chiller bypass junction 4156, between the chiller bypass valve 4154 and the chiller 4152, etc.).

As shown in FIGS. 12 and 13, the coolant system 4100 includes a four-way valve (e.g., a diverter valve, a switching valve, a dual mode valve, etc.), shown as switching valve 4140, fluidly coupled to the drivetrain loop 4112 and the battery loop 4114, according to some embodiments. The switching valve 4140 is configured to alternate the drivetrain loop 4112 and the battery loop 4114 between operating in parallel and operating in series. For example, the switching valve 4140 may be a four-way valve configured to direct the coolant received from an outlet of the drivetrain loop 4112 to an inlet of the drivetrain loop 4112 and the coolant received from an outlet of the battery loop 4114 to an inlet of the battery loop 4114 (e.g., to operate the drivetrain loop 4112 and the battery loop 4114 in parallel, etc.) or to direct the coolant received from the outlet of the drivetrain loop 4112 to the inlet of the battery loop 4114 and the coolant received from the outlet of the battery loop 4114 to the inlet of the drivetrain loop 4112 (e.g., to operate the drivetrain loop 4112 and the battery loop 4114 in series, etc.).

As shown in FIGS. 12 and 13, the drivetrain return line 4142 and the battery return line 4144 remain fluidly coupled to the coolant tank 4102 when the coolant system 4100 is placed in either the first configuration or the second configuration such that the drivetrain loop 4112 and the battery loop 4114 are always in direct fluid communication with the coolant tank 4102. The drivetrain return line 4142 may be coupled to the battery return line 4144 at a location proximate to where the drivetrain return line 4142 is coupled to the coolant tank 4102. In some embodiments, the drivetrain return line 4142 and the battery return line 4144 may be coupled to the outlet of the coolant tank 4102 such that the drivetrain return line 4142 and the battery return line 4144 are in fluid communication with the coolant tank 4102 through the outlet of the coolant tank 4102. In other embodiments, the drivetrain return line 4142 may be coupled to a first outlet of the coolant tank 4102 such that the drivetrain return line 4142 is in fluid communication with the coolant tank 4102 through the first outlet of the coolant tank 4102 and the battery return line 4144 may be coupled to a second outlet of the coolant tank 4102 such the battery return line 4144 is in fluid communication with the coolant tank 4102 through the second outlet of the coolant tank 4102.

As shown in FIG. 12, the switching valve 4140 may be placed in a first configuration that operates the drivetrain loop 4112 and the battery loop 4114 in parallel. For example, when the switching valve 4140 is in the first configuration, the coolant received by the switching valve 4140 from the radiator bypass junction 4134 flows to the inlet of the drivetrain pump 4120 without flowing through the battery loop 4114 and the coolant received by the switching valve 4140 from the battery heater 4158 flows to the inlet of the battery pump 4150 without flowing through the drivetrain loop 4112. In the first configuration, the coolant flowing through the drivetrain loop 4112 may flow through the drivetrain pump 4120, past the elements of the ESS 1300 (e.g., the charger assembly 1306, the front EDU 1308, the rear EDU 1310, the inverter 1312, etc.), through the radiator bypass valve 4132, through the radiator 4130 or around the radiator 4130 to the radiator bypass junction 4134 (e.g., depending on the configuration of the radiator bypass valve 4132, and back to the drivetrain pump 4120. In the first configuration, the coolant flowing through the battery loop 4114 may flow through the battery pump 4150, through the chiller bypass valve 4154, through the chiller 4152 or around the chiller 4152 to the chiller bypass junction 4156 (e.g., depending on the configuration of the chiller bypass valve 4154, etc.), through the battery heater 4158, past the battery 1302, and back to the battery pump 4150.

As shown in FIG. 13, the switching valve 4140 may be placed in a second configuration that operates the drivetrain loop 4112 and the battery loop 4114 in series. For example, when the switching valve 4140 is in the second configuration, the coolant received by the switching valve 4140 from the radiator bypass junction 4134 flows to the inlet of the battery pump 4150 and the coolant received from the battery heater 4158 flows to the inlet of the drivetrain pump 4120. In the second configuration, the coolant flowing through the drivetrain loop 4112 and the battery loop 4114 may flow through the drivetrain pump 4120, past the elements of the ESS 1300 (e.g., the charger assembly 1306, the front EDU 1308, the rear EDU 1310, the inverter 1312, etc.), through the radiator bypass valve 4132, through the radiator 4130 or around the radiator 4130 to the radiator bypass junction 4134 (e.g., depending on the configuration of the radiator bypass valve 4132, through the battery pump 4150, through the chiller bypass valve 4154, through the chiller 4152 or around the chiller 4152 to the chiller bypass junction 4156 (e.g., depending on the configuration of the chiller bypass valve 4154, etc.), through the battery heater 4158, past the battery 1302, and back to the drivetrain pump 4120.

In some embodiments, the switching valve 4140 may be controlled by the controller 4300. For example, the switching valve 4140 may include a motor (e.g., an electric motor, etc.) configured to alternate the switching valve 4140 between the first configuration that operates the drivetrain loop 4112 and the battery loop 4114 in parallel and the second configuration that operates the drivetrain loop 4112 and the battery loop 4114 in series. The motor of the switching valve 4140 may receive control signals from the controller 4300 (e.g., wired control signals, wireless control signals, etc.) that cause the motor to operate the switching valve 4140 between the first configuration and the second configuration.

Figure 14:
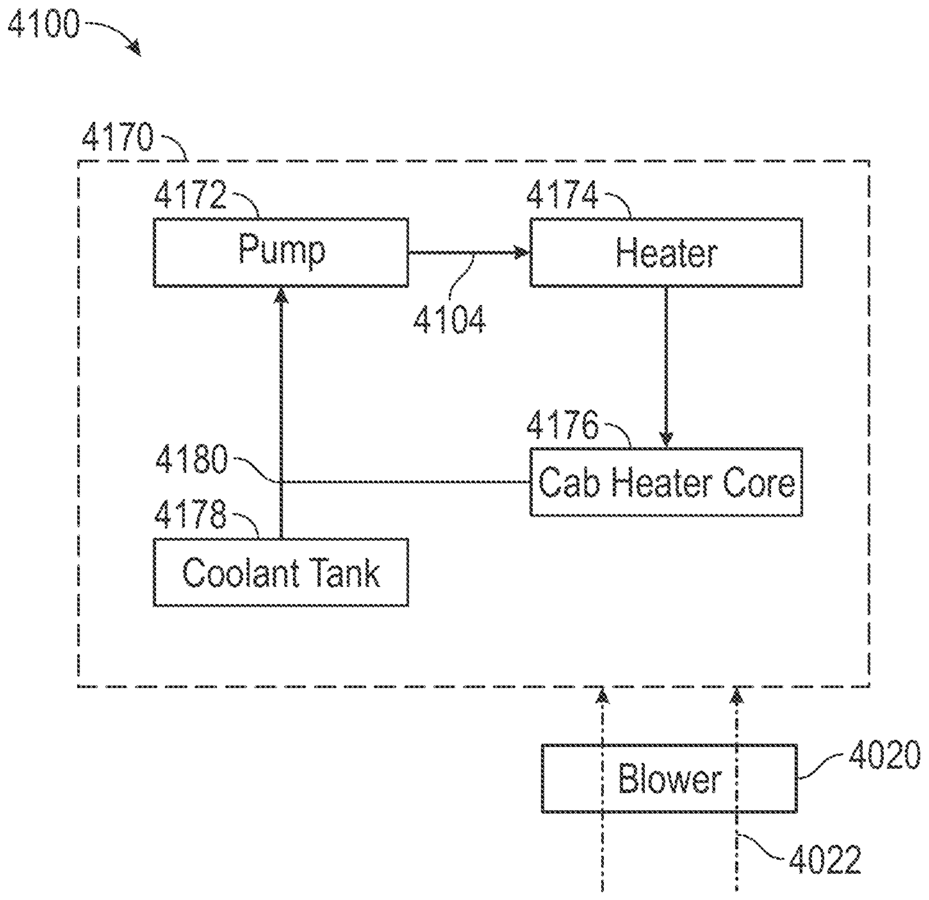
FIG. 14 is a schematic of a cab heater system of the coolant system of the thermal management system of FIG. 10, according to an exemplary embodiment.

As shown in FIG. 14, the cab heater system 4170 includes a third pump, shown as cab heater pump 4172 configured to circulate the coolant through the cab heater system 4170, according to some embodiments. The cab heater pump 4172 may receive the coolant through an inlet of the cab heater pump 4172 and provide the coolant through an outlet of the cab heater pump 4172. The cab heater pump 4172 may be a centrifugal pump, a reciprocating pump, a diaphragm pump, or any other type of pump that can circulate the coolant through the cab heater system 4170. In some embodiments, the cab heater system 4170 may include a plurality of the cab heater pumps 4172 positioned throughout the cab heater system 4170 to circulate the coolant through the cab heater system 4170.

In some embodiments, the cab heater pump 4172 may be controlled by the controller 4300. For example, the cab heater pump 4172 may include a motor (e.g., an electric motor, etc.) configured to operate the cab heater pump 4172 to circulate the coolant through the cab heater system 4170. The motor of the cab heater pump 4172 may receive control signals from the controller 4300 (e.g., wired control signals, wireless control signals, etc.) that cause the motor to operate the cab heater pump 4172 to circulate the coolant through the cab heater system 4170 or to cause the motor to not operate the cab heater pump 4172 so that the coolant is not circulated through the cab heater system 4170.

As shown in FIG. 14, the cab heater system 4170 includes a second heater, shown as cab heater 4174, fluidly coupled to the cab heater pump 4172 and configured to heat the coolant passing through the cab heater 4174, according to some embodiments. For example, the cab heater 4174 may be operated to heat the coolant such that heat provided to the coolant can be used to heat the cab 200 of the delivery vehicle 10. The cab heater 4174 may be fluidly coupled to the cab heater pump 4172 via the coolant lines 4104. In some embodiments, the cab heater 4174 may be controlled by the controller 4300. For example, the cab heater 4174 may be configured as an electric heater configured to apply an electric current through elements of the cab heater 4174 to provide heat to the coolant. The cab heater 4174 may receive control signals from the controller 4300 that cause the cab heater 4174 to apply the electric current through the elements of the cab heater 4174 to provide the heat to the coolant.

As shown in FIG. 14, the cab heater system 4170 includes a heat core (e.g., a radiator, a thermal core, etc.), shown as cab heater core 4176, fluidly coupled to the cab heater 4174 and configured to radiate heat from the coolant received by the cab heater core 4176 into the cab 200 of the delivery vehicle 10, according to some embodiments. For example, the cab heater core 4176 may be configured as a radiator that radiates heat from the coolant received by the cab heater core 4176 into the cab 200. In some embodiments, the cab heater core 4176 is positioned between the cab heater 4174 and the cab heater pump 4172 in the cab heater system 4170. In other embodiments, the cab heater core 4176 is otherwise positioned in the cab heater system 4170.

As shown in FIG. 14, the cab heater system 4170 includes a tank (e.g., a storage tank, a fluid container, etc.), shown as cab heater tank 4178, fluidly coupled to the cab heater pump 4172 and configured to store the coolant, according to some embodiments. In some embodiments, the cab heater tank 4178 is configured as an expansion tank that intakes excess coolant from the coolant lines 4104 as the coolant expands in volume as the temperature of the coolant increases and provides coolant back into the coolant lines 4104 as the coolant contracts in volume as the temperature of the coolant decreases. In other embodiments, the cab heater tank 4178 has a constant volume. The cab heater tank 4178 may be configured to remove air bubbles from the coolant in the cab heater system 4170. In some embodiments, the coolant tank 4102 and the cab heater tank 4178 are the same tank.

As shown in FIG. 14, the cab heater system 4170 includes a third coolant return line, shown as cab heater return line 4180, fluidly coupled between the cab heater tank 4178 and other elements of the cab heater system 4170. The cab heater return line 4180 may convey the coolant between the cab heater tank 4178 and the other elements of the cab heater system 4170. For example, the cab heater return line 4180 may convey the coolant from the cab heater tank 4178 to the cab heater pump 4172 when the coolant flowing to the cab heater pump 4172 decreases in volume as the temperature of the coolant decreases and may convey the coolant from cab heater core 4176 when the coolant flowing from the cab heater core 4176 increases in volume as the temperature of the coolant increases.

As shown in FIG. 14, the cab heater system 4170 includes a second fan (e.g., a blower, etc.), shown as cab blower 4020, configured to blow air, shown as blown air 4022, over the surface of the cab heater core 4176 in order to distribute heat throughout the cab 200, according to some embodiments. By blowing the blown air 4022 across the surface of the cab heater core 4176, a rate of heat transfer between the cab heater core 4176 and air in the cab 200 may be increased, allowing for the cab heater core 4176 to radiate additional heat into the cab 200. In some embodiments, the controller 4300 may operate the cab blower 4020 automatically based on programing or may use some combination of automatic control and manual operation to effectively distribute warm or cold air throughout the cab 200.

In some embodiments, the cab blower 4020 may be controlled by the controller 4300. For example, the cab blower 4020 may include a motor (e.g., an electric motor, etc.) configured to operate the cab blower 4020 to provide the blown air 4022 to the cab heater core 4176. The motor of the cab blower 4020 may receive control signals from the controller 4300 that cause the motor to operate the cab blower 4020 to provide the blown air 4022 to the cab heater core 4176 or not provide the blown air 4022 to the cab heater core 4176.

Figure 15:
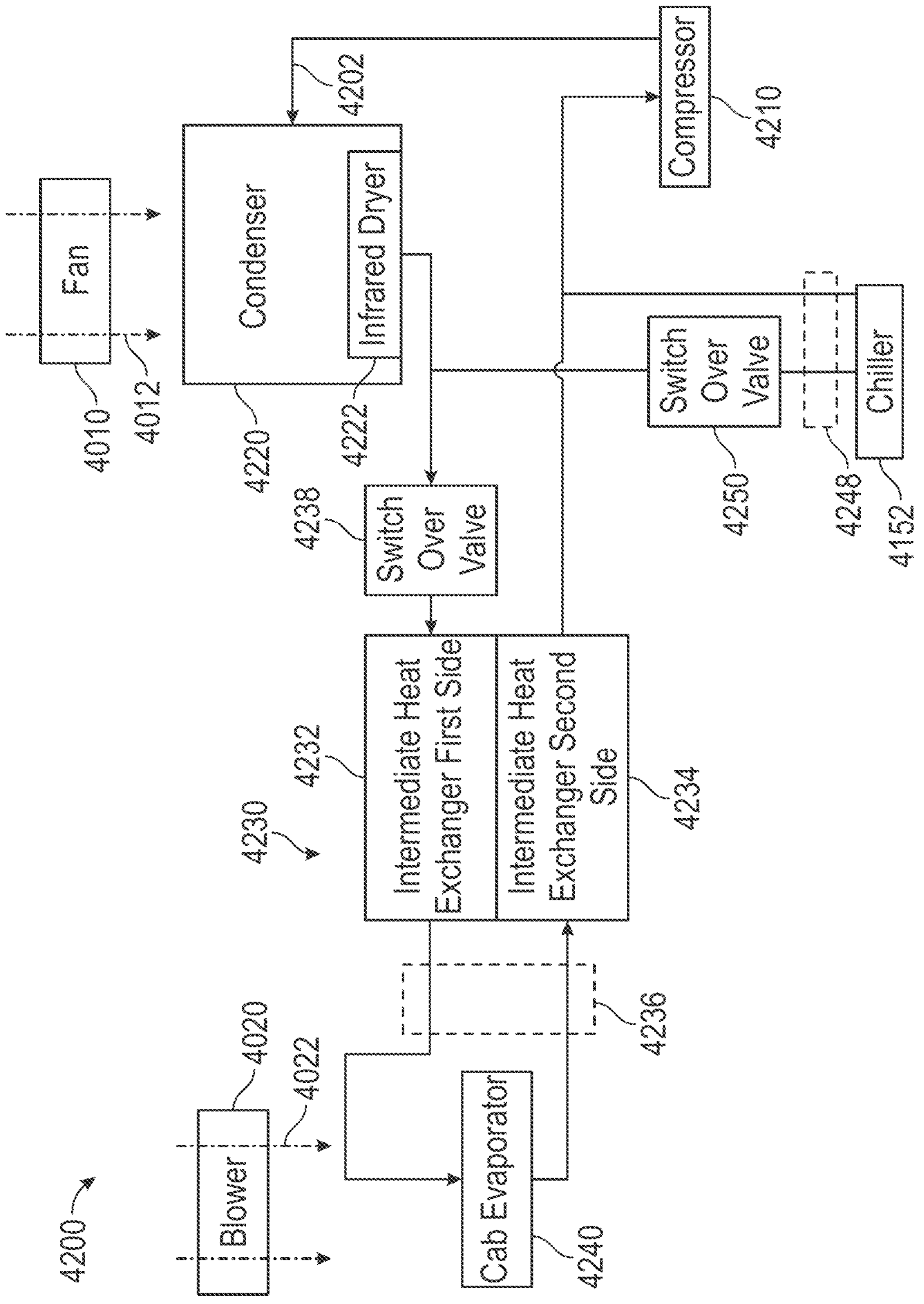
FIG. 15 is a cooling configuration of a refrigerant system of the thermal management system of FIG. 10, according to an exemplary embodiment.
Figure 16:
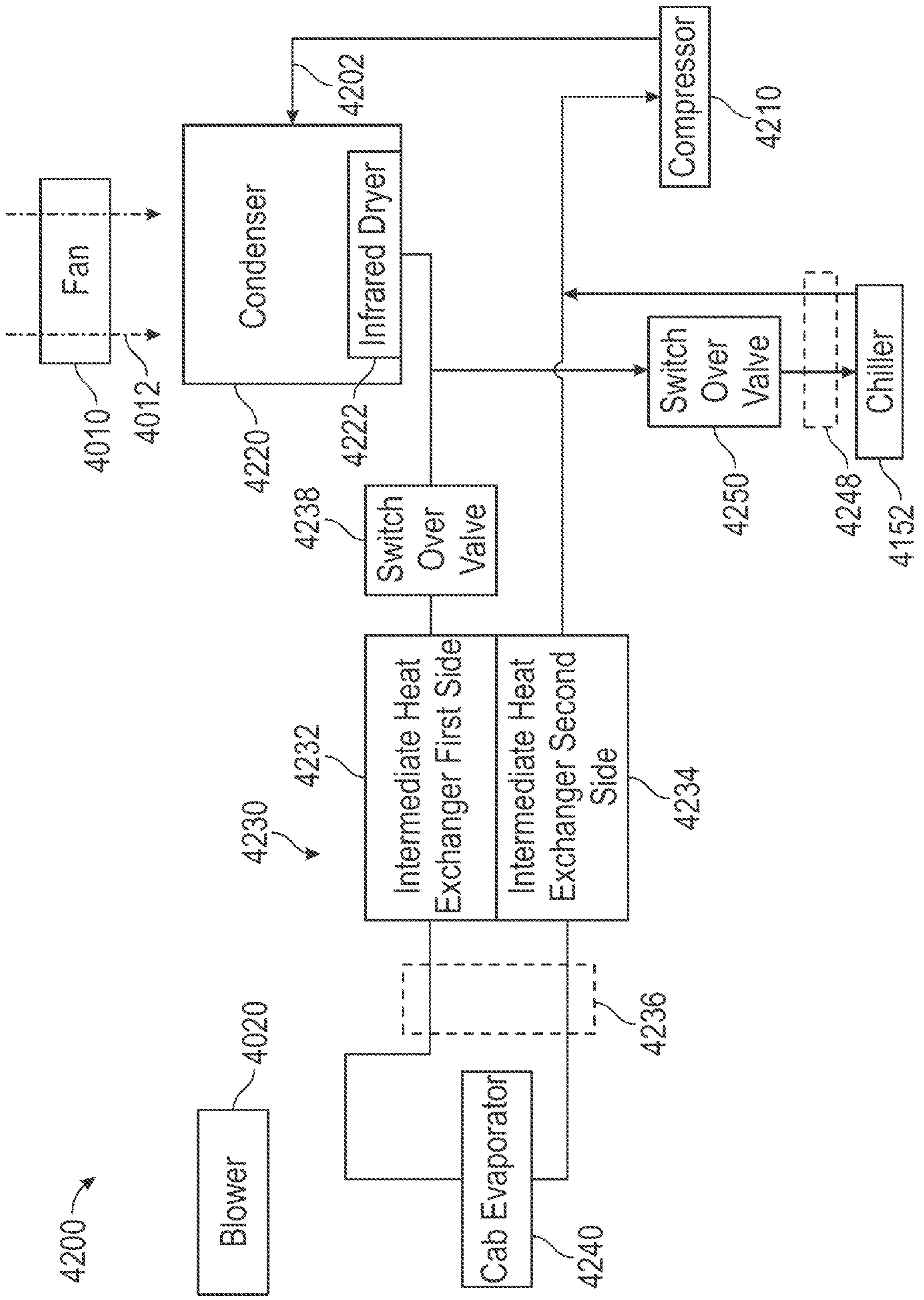
FIG. 16 is a heating configuration of the refrigerant system of the thermal management system of FIG. 10, according to an exemplary embodiment.

As shown in FIGS. 15 and 16, the refrigerant system 4200 includes a refrigerant (a chiller fluid, a coolant, etc.) and a series of conduits (e.g., lines, pipes, hoses, etc.), shown as refrigerant lines 4202 configured to convey the refrigerant through the refrigerant system 4200, according to some embodiments. The refrigerant may be a fluid that has a high thermal conductivity such that the refrigerant may absorb heat emitted by the coolant system 4100 and/or chill air provided to the cab 200.

As shown in FIGS. 15 and 16, the refrigerant system 4200 includes a compressor (e.g., a compression unit, etc.), shown as compressor 4210, configured to compress the refrigerant received by the compressor 4210 from a low pressure vapor into a high pressure vapor, according to some embodiments. For example, the compressor 4210 may be configured as a rotating impeller compressor configured to decrease a volume of the refrigerant received by the compressor 4210 to increase a pressure of the refrigerant such that a first pressure of the refrigerant received by the compressor 4210 is lower than a second pressure of the refrigerant outputted by the compressor 4210. In some embodiments, the compressor 4210 may increase a temperature of the refrigerant.

As shown in FIGS. 14 and 15, the refrigerant system 4200 includes a condenser (e.g., a condensing unit, etc.), shown as condenser 4220, fluidly coupled to the compressor 4210 and configured to decrease a temperature of the refrigerant received by the condenser 4220 from the compressor 4210, according to some embodiments. For example, the condenser 4220 may receive the refrigerant from the compressor 4210 (e.g., through the refrigerant lines 4202, etc.) that is at the second temperature of the refrigerant outputted by the compressor 4210. The condenser 4220 may be configured to decrease the temperature of the refrigerant from the second temperature to a third temperature that is lower than the second temperature such that the refrigerant is transformed from the high pressure vapor received by the condenser 4220 from the compressor 4210 into a high pressure liquid. As shown in FIGS. 14 and 15, the radiator fan 4010 of the coolant system 4100 is configured to force the forced air 4012 across the condenser 4220 to remove heat from the refrigerant in the condenser 4220, which may cause the refrigerant to condense from the high pressure vapor into the high pressure liquid. In other embodiments, the refrigerant system 4200 includes a fan configured to blow air across the condenser 4220 (e.g., when the radiator fan 4010 is not configured to force air across the condenser 4220, etc.).

As shown in FIGS. 14 and 15, the condenser 4220 includes a dryer (e.g., a moisture reducer, a dehumidifier, a dehydrator, etc.), shown as infrared dryer 4222, configured to remove moisture from the refrigerant outputted by the condenser 4220, according to some embodiments. The infrared dryer 4222 may remove the moisture from the refrigerant outputted by the condenser 4220 to prevent performance issues in the refrigerant system 4200 that could be caused by moisture present in the refrigerant. The infrared dryer 4222 may emit infrared radiation that targets the refrigerant, heating up any moisture in the refrigerant and causing the moisture to evaporate. The infrared dryer 4222 may then separate the moisture from the refrigerant (e.g., to a drain, etc.) to remove the moisture from the refrigerant.

As shown in FIGS. 14 and 15, the refrigerant system 4200 includes a heat exchanger, shown as intermediate heat exchanger 4230, selectively fluidly coupled to the condenser 4220 and configured to receive the refrigerant from the condenser 4220, according to some embodiments. As shown in FIGS. 14 and 15, the intermediate heat exchanger 4230 includes a first side (e.g., an inlet, etc.) shown as inlet 4232, fluidly coupled to the condenser 4220 and configured to receive the refrigerant from the condenser 4220 and a second side (e.g., an outlet, etc.), shown as outlet 4234, thermally coupled to the inlet 4232 and configured receive heat from the refrigerant in the inlet 4232 of the intermediate heat exchanger 4230. The intermediate heat exchanger 4230 may decrease the temperature of the refrigerant passing through the inlet 4232 and increase the temperature of the refrigerant passing through the outlet 4234.

As shown in FIGS. 14 and 15, the refrigerant system 4200 includes a first expansion valve, shown as first expansion valve 4236, fluidly coupled to the intermediate heat exchanger 4230 and configured to restrict the flow of the refrigerant through the first expansion valve 4236, according to some embodiments. For example, the first expansion valve 4236 may cause the refrigerant flowing through the first expansion valve 4236 to transform from the high pressure liquid received from the condenser 4220 into a low pressure liquid. When the pressure of the refrigerant is decreased by the first expansion valve 4236, a temperature of the refrigerant may be decreased.

As shown in FIGS. 14 and 15, the refrigerant system 4200 includes an evaporator (e.g., a vaporizer, an evaporation unit, etc.), shown as cab evaporator 4240, fluidly coupled to the first expansion valve 4236, according to some embodiments. The cab evaporator 4240 is configured to absorb heat from air in the cab 200 into the refrigerant passing through the cab evaporator 4240 to decrease a temperature of the air inside the cab 200. When the refrigerant passes through the cab evaporator 4240 and absorbs the heat from the air in the cab 200, the refrigerant may be transformed from the low pressure liquid received from the first expansion valve 4236 into a low pressure gas outputted by the cab evaporator 4240. The cab evaporator 4240 may be fluidly coupled with the outlet 4234 of the intermediate heat exchanger 4230 such that the refrigerant outputted by the cab evaporator 4240 flowing through the outlet 4234 of the intermediate heat exchanger 4230 receives heat from the refrigerant flowing through the inlet 4232 of the intermediate heat exchanger 4230. The cab evaporator 4240 may be fluidly coupled to the compressor 4210 such that the refrigerant outputted by the cab evaporator 4240 flows to an inlet of the compressor 4210.

As shown in FIGS. 14 and 15, the cab blower 4020 of the coolant system 4100 is configured to blow the blown air 4022 over the surface of the cab evaporator 4240 in order to distribute cool air throughout the cab 200. In other embodiments, the refrigerant system 4200 includes a fan configured to blow air across the cab evaporator 4240 (e.g., when the cab blower 4020 is not configured to blow air across the cab evaporator 4240, etc.). In some embodiments, the cab 200 includes multiple ducts and blowers to effectively distribute warm or cold air throughout the cab 200 from the cab heater core 4176 and the cab evaporator 4240, respectively.

As sown in FIGS. 14 and 15, the refrigerant system 4200 includes a first valve, shown as evaporator valve 4238, fluidly coupled to the condenser 4220, according to some embodiments. The evaporator valve 4238 is configured to selectively allow for the refrigerant to flow from the condenser 4220 to the inlet 4232 of the intermediate heat exchanger 4230. For example, the evaporator valve 4238 may be a ball valve configured to allow for the refrigerant to flow through the evaporator valve 4238 or prevent the refrigerant from flowing through the evaporator valve 4238.

As shown in FIG. 15, the evaporator valve 4238 may be placed in a first configuration that allows the refrigerant to flow between the condenser 4220 and the first expansion valve 4236 (e.g., through the inlet 4232 of the intermediate heat exchanger 4230, etc.). For example, when the evaporator valve 4238 is placed in the first configuration, at least a portion of the refrigerant outputted by the condenser 4220 flows through the evaporator valve 4238 to the cab evaporator 4240 to absorb heat from the air of the cab 200.

As shown in FIG. 16, the evaporator valve 4238 may be placed in a second configuration that prevents the refrigerant from flowing between the condenser 4220 and the first expansion valve 4236. For example, when the evaporator valve 4238 is placed in the second configuration, the refrigerant outputted by the condenser 4220 does not flow through the evaporator valve 4238 to the cab evaporator 4240.

In some embodiments, the evaporator valve 4238 may be controlled by the controller 4300. For example, the evaporator valve 4238 may include a motor (e.g., an electric motor, etc.) configured to alternate the evaporator valve 4238 between the first configuration and the second configuration. The motor of the evaporator valve 4238 may receive control signals from the controller 4300 that cause the motor to operate the evaporator valve 4238 between the first configuration and the second configuration.

As shown in FIGS. 14 and 15, the refrigerant system 4200 includes a second expansion valve, shown as second expansion valve 4248, fluidly coupled to the intermediate heat exchanger 4230 in parallel with the first expansion valve 4236 and configured to restrict the flow of the refrigerant through the second expansion valve 4248, according to some embodiments. For example, the second expansion valve 4248 may cause the refrigerant flowing through the second expansion valve 4248 to transform from the high pressure liquid received from the condenser 4220 into a low pressure liquid. When the pressure of the refrigerant is decreased by the second expansion valve 4248, a temperature of the refrigerant may be decreased.

As shown in FIGS. 14 and 15, the refrigerant system 4200 includes the chiller 4152 of the battery loop 4114 fluidly coupled to the second expansion valve 4248, according to some embodiments. The chiller 4152 is configured to transfer heat from the coolant flowing through the chiller 4152 in the coolant system 4100 into the refrigerant flowing through the chiller 4152 in the refrigerant system 4200 to transfer heat from the coolant system 4100 into the refrigerant system 4200. When the refrigerant passes through the chiller 4152 and absorbs the heat from the coolant passing through the chiller 4152, the refrigerant may be transformed from the low pressure liquid received from the second expansion valve 4248 into a low pressure gas outputted by the chiller 4152. The chiller 4152 may be fluidly coupled to the compressor 4210 such that the refrigerant outputted by the chiller 4152 flows to the inlet of the compressor 4210.

As sown in FIGS. 14 and 15, the refrigerant system 4200 includes a second valve, shown as chiller valve 4250, fluidly coupled to the condenser 4220, according to some embodiments. The chiller valve 4250 is configured to selectively allow for the refrigerant to flow from the condenser 4220 to the second expansion valve 4248. For example, the chiller valve 4250 may be a ball valve configured to allow for the refrigerant to flow through the chiller valve 4250 or prevent the refrigerant from flowing through the chiller valve 4250.

As shown in FIG. 16, the chiller valve 4250 may be placed in a first configuration that allows the refrigerant to flow between the condenser 4220 and the second expansion valve 4248. For example, when the chiller valve 4250 is placed in the first configuration, at least a portion of the refrigerant outputted by the condenser 4220 flows through the chiller valve 4250 to the chiller 4152 to absorb heat from the coolant of the coolant system 4100.

As shown in FIG. 15, the chiller valve 4250 may be placed in a second configuration that prevents the refrigerant from flowing between the condenser 4220 and the second expansion valve 4248. For example, when the chiller valve 4250 is placed in the second configuration, the refrigerant outputted by the condenser 4220 does not flow through the chiller valve 4250 to the chiller 4152.

In some embodiments, the chiller valve 4250 may be controlled by the controller 4300. For example, the chiller valve 4250 may include a motor (e.g., an electric motor, etc.) configured to alternate the chiller valve 4250 between the first configuration and the second configuration.

The motor of the chiller valve 4250 may receive control signals from the controller 4300 that cause the motor to operate the chiller valve 4250 between the first configuration and the second configuration.

As shown in FIG. 11, the thermal management system 4000 includes a plurality of temperature sensors (e.g., thermometers, etc.), shown as temperature sensors 4030, configured to obtain temperature data associated with temperatures of the coolant flowing through the coolant system 4100 and/or the refrigerant flowing through the refrigerant system 4200, according to some embodiments. For example, the temperature sensors 4030 may be configured to obtain the temperature data associated with the temperatures of the coolant proximate elements of the drivetrain loop 4112, the temperature data associated with the temperatures of the coolant proximate elements of the battery loop 4114, and/or the temperature data associated with the pressures of the refrigerant proximate elements of the refrigerant system 4200. The temperature sensors 4030 may be communicably coupled to the controller 4300 such that the temperature sensors 4030 may provide the temperature data associated with the temperatures of the coolant flowing through the coolant system 4100 and/or the refrigerant flowing through the refrigerant system 4200.

As shown in FIG. 11, the thermal management system 4000 includes a plurality of pressure sensors (e.g., pressure gages, etc.), shown as pressure sensors 4040, configured to obtain pressure data associated with pressures of the coolant flowing through the coolant system 4100 and/or the refrigerant flowing through the refrigerant system 4200, according to some embodiments. For example, the pressure sensors 4040 may be configured to obtain the pressure data associated with the pressures of the coolant proximate elements of the drivetrain loop 4112, the pressure data associated with the pressures of the coolant proximate elements of the battery loop 4114, and/or the pressure data associated with the pressures of the refrigerant proximate elements of the refrigerant system 4200. The pressure sensors 4040 may be communicably coupled to the controller 4300 such that the pressure sensors 4040 may provide the pressure data associated with the pressures of the coolant flowing through the coolant system 4100 and/or the refrigerant flowing through the refrigerant system 4200.

In various embodiments, the thermal management system 4000 includes a plurality of sensors configured to obtain sensor data associated with the coolant system 4100 and/or the refrigerant system 4200. For example, the thermal management system 4000 may include flow sensors configured to obtain sensor data associated with a flow rate of the coolant and/or the refrigerant, position sensors configured to obtain sensor data associated with positions of valves of the coolant system 4100 and/or the refrigerant system 4200, etc.

The controller 4300 includes processing circuitry 4302 including a processor 4304 and memory 4306. The processing circuitry 4302 can be communicably connected with a communications interface of controller 4300 such that processing circuitry 4302 and the various components thereof can send and receive data via the communications interface. The processor 4304 can be implemented as a general purpose processor, an application specific integrated circuit (ASIC), one or more field programmable gate arrays (FPGAs), a group of processing components, or other suitable electronic processing components.

The memory 4306 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 4306 can be or include volatile memory or non-volatile memory. The memory 4306 can include database components, object code components, script components, or any other type of information structure for supporting the various activities and information structures described in the present application. According to some embodiments, the memory 4306 is communicably connected to the processor 4304 via the processing circuitry 4302 and includes computer code for executing (e.g., by at least one of the processing circuitry 4302 or the processor 4304) one or more processes described herein.

The controller 4300 is configured to receive inputs (e.g., pressure data, temperature data, sensor data, operating characteristics, etc.) from the temperature sensors 4030 and/or the pressure sensors 4040, according to some embodiments. For example, the controller 4300 may receive the temperature data associated with the coolant flowing through the coolant system 4100. The controller 4300 may be configured to provide control outputs (e.g., control decisions, control signals, etc.) to the elements of the thermal management system 4000 based on the inputs received by the controller 4300. For example, the controller 4300 may generate a control signal for the radiator fan 4010 to provide the forced air 4012 to the radiator 4130 in response to receiving temperature data from one of the temperature sensors 4030 positioned downstream of the radiator 4130 indicating that a temperature of the coolant downstream of the radiator 4130 is above a temperature threshold. The controller 4300 may operate automatically based on programing or may use some combination of automatic control and manual operation.

In some embodiments, the controller 4300 is configured to receive inputs (e.g., selections, settings, etc.) from a user interface of the delivery vehicle 10, according to some embodiments. For example, the controller 4300 may receive a user input from the operator of the delivery vehicle 10 from a cab environment interface associated with a temperature of the cab 200. The controller 4300 may provide control outputs to the elements of the thermal management system 4000 based on the user input that result in changes to the temperature of the cab 200. For example, if the user input is associated with increasing the temperature of the cab 200, the controller 4300 may send a control signal to the cab heater 4174 to increase an amount of heat transferred from the cab heater 4174 to the coolant flowing through the cab heater 4174.

In response to the inputs, the controller 4300 may provide control signals to the radiator bypass valve 4132 to operate the radiator bypass valve 4132 between the first configuration and the second configuration, according to some embodiments. For example, in response to receiving temperature data indicating that the coolant in the drivetrain loop 4112 is above a temperature threshold, the controller 4300 may provide a control signal to the radiator bypass valve 4132 to operate the radiator bypass valve 4132 from the second configuration of the radiator bypass valve 4132 where the radiator bypass valve 4132 directs the coolant around the radiator 4130 to the first configuration of the radiator bypass valve 4132 where the radiator bypass valve 4132 directs the coolant through the radiator 4130. As a result, the radiator 4130 may radiate a portion of the heat contained in the coolant and the temperature of the coolant may be decreased toward the temperature threshold.

As another example, in response to receiving temperature data indicating that the coolant in the drivetrain loop 4112 is below a temperature threshold, the controller 4300 may provide a control signal to the radiator bypass valve 4132 to operate the radiator bypass valve 4132 from the first configuration of the radiator bypass valve 4132 to the second configuration of the radiator bypass valve 4132. As a result, the coolant does not pass through the radiator 4130 and the temperature of the coolant may be increased (e.g., by the heat generated by the ESS 1300, etc.) toward the temperature threshold. In some embodiments, the controller 4300 may provide a control signal to the radiator fan 4010 to force the forced air 4012 across the radiator 4130 when the radiator bypass valve 4132 is in the first configuration that directs the coolant through the radiator 4130.

In response to the inputs, the controller 4300 may provide control signals to the chiller bypass valve 4154 to operate the chiller bypass valve 4154 between the first configuration of the chiller bypass valve 4154 and the second configuration of the chiller bypass valve 4154. For example, in response to receiving temperature data indicating that the coolant in the battery loop 4114 is above a temperature threshold, the controller 4300 may provide a control signal to the chiller bypass valve 4154 to operate the chiller bypass valve 4154 from the second configuration of the chiller bypass valve 4154 where the chiller bypass valve 4154 directs the coolant around the chiller 4152 to the first configuration of the chiller bypass valve 4154 where the chiller bypass valve 4154 directs the coolant through the chiller 4152. As a result, the chiller 4152 may transfer a portion of the heat contained in the coolant to the refrigerant flowing through the chiller 4152 and the temperature of the coolant may be decreased toward the temperature threshold.

As another example, in response to receiving temperature data indicating that the coolant in the battery loop 4114 is below a temperature threshold, the controller 4300 may provide a control signal to the chiller bypass valve 4154 to operate the chiller bypass valve 4154 from the first configuration of the chiller bypass valve 4154 to the second configuration of the chiller bypass valve 4154. As a result, the coolant does not pass through the chiller 4152 and the temperature of the coolant may be increased (e.g., by the battery heater 4158, etc.) toward the temperature threshold.

In response to the inputs, the controller 4300 may provide control signals to the switching valve 4140 to operate the switching valve 4140 between the first configuration of the switching valve 4140 and the second configuration of the switching valve 4140. For example, in response to receiving temperature data indicating that the coolant in the battery loop 4114 is below a temperature threshold, the controller 4300 may provide a control signal to the switching valve 4140 to operate the switching valve 4140 from the first configuration of the switching valve 4140 where the switching valve 4140 operates the drivetrain loop 4112 and the battery loop 4114 in parallel to the second configuration of the switching valve 4140 where the switching valve 4140 operates the drivetrain loop 4112 and the battery loop 4114 in series. As a result, the coolant that is heated by the ESS 1300 in the drivetrain loop 4112 can pass from the drivetrain loop 4112 to the battery loop 4114 and the heat in the coolant from the ESS 1300 can be used to heat the battery 1302. As another example, in response to receiving an indication that the battery 1302 is in a charging state, the controller 4300 may provide a control signal to the switching valve 4140 to operate the switching valve 4140 from the first configuration of the switching valve 4140 where the switching valve 4140 operates the drivetrain loop 4112 and the battery loop 4114 in parallel to the second configuration of the switching valve 4140 where the switching valve 4140 operates the drivetrain loop 4112 and the battery loop 4114 in series.

As yet another example, in response to receiving temperature data indicating that the temperature of the coolant in the battery loop 4114 is above a temperature threshold, the controller 4300 may provide a control signal to the switching valve 4140 to operate the switching valve 4140 from the second configuration of the switching valve 4140 to the first configuration of the switching valve 4140. As a result, the coolant that is heated by the ESS 1300 in the drivetrain loop 4112 does not flow into the battery loop 4114 and the heat in the coolant from the ESS 1300 does not reach the battery 1302.

In response to the inputs, the controller 4300 may provide control signals to the evaporator valve 4238 to operate the evaporator valve 4238 between the first configuration of the evaporator valve 4238 and the second configuration of the evaporator valve 4238. For example, in response to receiving a user input corresponding to decreasing a temperature in the cab 200, the controller 4300 may provide a control signal to the evaporator valve 4238 to operate the evaporator valve 4238 from the second configuration of the evaporator valve 4238 that restricts the flow of the refrigerant to the cab evaporator 4240 to the first configuration of the evaporator valve 4238 that allows the flow of the refrigerant to the cab evaporator 4240. As another example, in response to receiving the user input corresponding to decreasing the temperature in the cab 200 and receiving temperature data indicating that the temperature in the cab has reached a temperature threshold associated with the user input, the controller 4300 may provide a control signal to the evaporator valve 4238 to operate the evaporator valve 4238 from the first configuration of the evaporator valve 4238 to the second configuration of the evaporator valve 4238.

In response to the inputs, the controller 4300 may provide control signals to the chiller valve 4250 to operate the chiller valve 4250 between the first configuration of the chiller valve 4250 and the second configuration of the chiller valve 4250. For example, in response to receiving temperature data associated with a temperature of the coolant in the battery loop 4114 being above a temperature threshold, the controller 4300 may provide a control signal to the chiller valve 4250 to operate the chiller valve 4250 from the second configuration that restricts the flow of the refrigerant to the chiller 4152 to the first configuration that allows the flow of refrigerant to the chiller 4152 so that heat can be transferred from the coolant in the battery loop 4114 to the refrigerant through the chiller 4152. As another example, in response to receiving temperature data associated with a temperature of the coolant in the battery loop 4114 being below the temperature threshold, the controller 4300 may provide a control signal to the chiller valve 4250 to operate the chiller valve 4250 from the first configuration to the second configuration so that heat cannot be transferred from the coolant in the battery loop 4114 to the refrigerant through the chiller 4152.

In various embodiments, the controller 4300 may provide control signals to the evaporator valve 4238 and the chiller valve 4250 to operate the evaporator valve 4238 and the chiller valve 4250 such that the evaporator valve 4238 allows the refrigerant to flow to the cab evaporator 4240 and the chiller valve 4250 allows the refrigerant to flow to the chiller 4152 such that the refrigerant flows through both the chiller 4152 and the cab evaporator 4240 in parallel. In various embodiments, the controller 4300 may provide control signals to the evaporator valve 4238 and the chiller valve 4250 to operate the evaporator valve 4238 and the chiller valve 4250 such that the evaporator valve 4238 does not allow the refrigerant to flow to the cab evaporator 4240 and the chiller valve 4250 does not allow for the refrigerant to flow to the chiller 4152.

Figure 17:
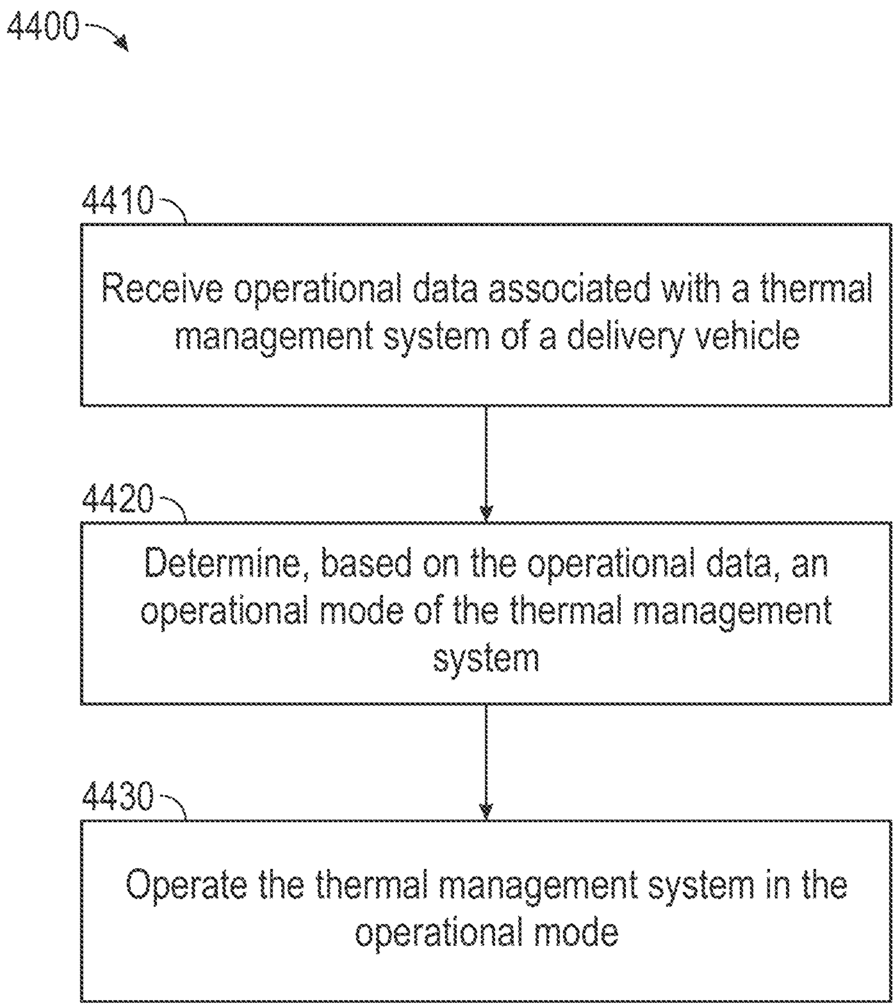
FIG. 17 is a flow diagram of a process for operating a thermal management system of a delivery vehicle according to different modes of operation, according to an exemplary embodiment.

Referring to FIG. 17, a process 4400 for operating a thermal management system of a delivery vehicle according to different modes of operation (e.g., a charging mode, a driving mode, etc.) includes steps 4410-4420, according to some embodiments. The process 4400 may be performed, at least in part, by the controller 4300. In some embodiments, the process 4400 is performed for the thermal management system 4000 of the delivery vehicle 10 such that the switching valve 4140 can be alternated between the first configuration of the switching valve 4140 where the drivetrain loop 4112 and the battery loop 4114 are operated in parallel and the second configuration of the switching valve 4140 where the drivetrain loop 4112 and the battery loop 4114 are operated in series.

The process 4400 includes receiving operational data associated with a thermal management system of a delivery vehicle (step 4410), according to some embodiments. In some embodiments, the delivery vehicle is the delivery vehicle 10 and includes the thermal management system 4000. The operational data may include sensor data received from the sensors of the thermal management system 4000, user inputs received from the operator of the delivery vehicle 10, operational parameters of the delivery vehicle 10, etc. For example, the operational data may include temperature data received from the temperature sensors 4030, pressure data received from the pressure sensors 4040, and indication that the battery 1302 of the delivery vehicle 10 is being charged (e.g., from the battery 1302, from the charger assembly 1306, etc.), or any other data relating to the delivery vehicle 10.

The process 4400 includes determining, based on the operational data, an operational mode of the thermal management system (step 4420), according to some embodiments. In some embodiments, the thermal management system includes a first operational mode where a first loop of the thermal management system thermally coupled to elements of a drivetrain of the delivery vehicle and a second loop of the thermal management system thermally coupled to a battery of the delivery vehicle are operated in parallel and a second operational mode where the first loop and the second loop are operated in series. The process 4400 may include determining the first operational mode of the thermal management system or the second operational mode of the thermal management system based on the operational data. For example, the operational data may include an indication that a temperature of coolant in the second loop is below a temperature threshold and an indication that the battery of the delivery vehicle is being charged. The second operational mode of the thermal management may be selected that places the first loop and the second loop in series to allow for thermal waste of the elements of the drivetrain to be used to heat the battery so that the battery may be charged at an optimal temperature.

In some embodiments, the controller 4300 determines the operational mode of the thermal management system 4000 based on the operational data. In some embodiments, the thermal management system 4000 includes a first operational mode and a second operational mode. In the first operational mode, the drivetrain loop 4112 and the battery loop 4114 are operated in parallel. For example, the switching valve 4140 may be placed in the first configuration so that the coolant in the drivetrain loop 4112 flows around the drivetrain loop 4112 in parallel to the coolant flowing around the battery loop 4114. In the second operational mode, the drivetrain loop 4112 and the battery loop 4114 are operated in series. For example, the switching valve 4140 may be placed in the second configuration so that the coolant flows through the drivetrain loop 4112 and the battery loop 4114 in series.

The process 4400 includes operating the thermal management system in the operational mode (step 4430), according to some embodiments. For example, the thermal management system may be operated in the operational mode determined in step 4420. In some embodiments, the thermal management system may be operated in the first operational mode, or the second operational mode based on whether the first operational mode or the second operational mode was selected during step 4430. For example, if the first operational mode was selected in step 4420 based on the operational data, the thermal management system may be operated in the first operational mode where the first loop and the second loop are operated in parallel. As another example, if the second operational mode was selected in step 4420 based on the operational data, the thermal management system may be operated in the second operational mode where the first loop and the second loop are operated in series.

In some embodiments, the controller 4300 operates the thermal management system 4000 in the operational mode determined in step 4420. For example, if the first operational mode is determined in step 4420, the controller 4300 may operate the switching valve 4140 so that the drivetrain loop 4112 and the battery loop 4114 are operated in parallel. When the drivetrain loop 4112 and the battery loop 4114 are operated in parallel, the drivetrain loop 4112 and the battery loop 4114 may remain fluidly coupled at a location proximate where the drivetrain loop 4112 and the battery loop 4114 are coupled to the coolant tank 4102 (e.g., via the drivetrain return line 4142 and the battery return line 4144, etc.). As another example, if the second operational mode is determined in step 4420, the controller 4300 may operate the switching valve 4140 so that the drivetrain loop 4112 and the battery loop 4114 are operated in series.

In some embodiments, the process 4400 includes receiving an update to the operational data received in step 4410. For example, the controller 4300 may receive updated operational data indicating that a condition of the thermal management system 4000 has changed since the operational data was received in step 4410. The controller 4300 may change the operational mode of the thermal management system 4000 based on the update to the operational data. For example, the controller 4300 may change the operational mode of the thermal management system from the first operational mode to the second operational mode or from the second operational mode to the first operational mode based on the update to the operational data.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the delivery vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A thermal management system for a vehicle, comprising:

a first loop in thermal communication with a component of a drivetrain of a vehicle, the first loop comprising a first pump configured to circulate a coolant through the first loop;

a second loop in thermal communication with a battery of the vehicle, the battery configured to provide electrical energy to the drivetrain, the second loop comprising a second pump configured to circulate the coolant through the second loop;

a coolant tank in fluid communication with the first loop and the second loop;

a dual mode valve transitionable between a first configuration and a second configuration; and an energy storage system ("ESS") comprising:

the battery;

a front electrical distribution unit ("EDU") configured to distribute the electrical energy from the battery to a forward element of the drivetrain; and a rear EDU configured to distribute the electrical energy from the battery to a rearward element of the drivetrain;

wherein the first loop operates in parallel with the second loop when the dual mode valve is in the first configuration;

wherein the first loop operates in series with the second loop when the dual mode valve is in the second configuration;

wherein the first loop is in fluid communication with the second loop when the dual mode valve is in either the first configuration or the second configuration; and wherein a first portion of the first loop in thermal communication with the front EDU operates in parallel with a second portion of the first loop in thermal communication with the rear EDU.

2. The thermal management system of claim 1, wherein the first loop is coupled to the second loop at a location proximate where the first loop is coupled to the coolant tank.

3. The thermal management system of claim 1, wherein the second loop comprises a heater configured to heat the coolant in the second loop; and wherein when the dual mode valve is in the second configuration, the coolant flowing serially through the first loop and the second loop flows through the heater.

4. The thermal management system of claim 1 further comprising:

a refrigerant system configured to adjust a temperature a cab of the vehicle, the refrigerant system in thermal communication with the second loop.

5. The thermal management system of claim 4, wherein the first loop comprises a radiator configured to radiate heat from the coolant flowing through the first loop;

wherein the refrigerant system comprises a condenser configured to condense refrigerant flowing through the refrigerant system; and wherein the thermal management system further comprises a fan configured to induce a flow of air across the radiator of the first loop and the condenser of the refrigerant system.

6. The thermal management system of claim 1, wherein the first loop comprises a first return line in fluid communication with the coolant tank; and wherein the second loop comprises a second return line in fluid communication with the coolant tank and coupled to the first return line such that the first return line and the second return line are in fluid communication.

7. The thermal management system of claim 6, wherein the coolant tank comprises an outlet coupled to the first return line and the second return line.

8. The thermal management system of claim 1 further comprising processing circuitry configured to:

receive operational data associated with the thermal management system;

determine, based on the operational data, an operational mode of the thermal management system, wherein the operational mode is the first configuration of the dual mode valve or the second configuration of the dual mode valve; and operate the thermal management system in the operational mode by placing the dual mode valve in the first configuration or the second configuration.

9. The thermal management system of claim 8, wherein the operational data corresponds to at least one of a charging state of the battery or a temperature of the coolant in the second loop being below a temperature threshold.

10. The thermal management system of claim 1, wherein the coolant tank comprises an outlet coupled to the first loop and the second loop such that the first loop and the second loop are in fluid communication with the coolant tank.

11. A delivery vehicle, comprising:

a chassis and a plurality of tractive elements;

a battery assembly comprising a plurality of batteries;

a drivetrain configured to consume electrical energy provided by the plurality of batteries to drive the plurality of tractive elements;

a thermal management system comprising:

a first loop in thermal communication with a component of the drivetrain, the first loop comprising a first pump configured to circulate a coolant through the first loop;

a second loop in thermal communication with the battery assembly, the second loop comprising a second pump configured to circulate the coolant through the second loop; and a coolant tank in fluid communication with the first loop and the second loop;

a front electrical distribution unit ("EDU") configured to distribute the electrical energy from the plurality of batteries to a forward element of the drivetrain; and a rear EDU configured to distribute the electrical energy from the plurality of batteries to a rearward element of the drivetrain;

wherein in a first operational mode of the thermal management system, the first loop operates in parallel with the second loop;

wherein in a second operational mode of the thermal management system, the first loop operates in series with the second loop;

wherein the first loop is in fluid communication with the second loop when the thermal management system is in either the first operational mode or the second operational mode; and wherein a first portion of the first loop in thermal communication with the front EDU operates in parallel with a second portion of the first loop in thermal communication with the rear EDU.

12. The delivery vehicle of claim 11, wherein the first loop is coupled to the second loop at a location proximate where the first loop is coupled to the coolant tank.

13. The delivery vehicle of claim 11, wherein the second loop comprises a heater configured to heat the coolant in the second loop; and wherein when the thermal management system is in the second operational mode, the coolant flowing serially through the first loop and the second loop flows through the heater.

14. The delivery vehicle of claim 11, wherein the thermal management system further comprises:

a refrigerant system configured to adjust a temperature a cab of the delivery vehicle, the refrigerant system in thermal communication with the second loop, the refrigerant system comprising a condenser configured to condense refrigerant flowing through the refrigerant system;

wherein the first loop comprises a radiator configured to radiate heat from the coolant flowing through the first loop; and wherein the thermal management system further comprises a fan configured to force air across the radiator of the first loop and the condenser of the refrigerant system.

* * * * *